US010958888B2

(12) United States Patent
Yanai et al.

(10) Patent No.: US 10,958,888 B2
(45) Date of Patent: Mar. 23, 2021

(54) IMAGE PROCESSING APPARATUS, IMAGE PROCESSING METHOD AND STORAGE MEDIUM FOR STORING PROGRAM

(71) Applicant: CANON KABUSHIKI KAISHA, Tokyo (JP)

(72) Inventors: Yumi Yanai, Yokohama (JP); Shinichi Miyazaki, Kawasaki (JP); Yuji Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 16/275,448

(22) Filed: Feb. 14, 2019

(65) Prior Publication Data
US 2019/0253690 A1 Aug. 15, 2019

(30) Foreign Application Priority Data
Feb. 15, 2018 (JP) .............................. JP2018-025351

(51) Int. Cl.
H04N 13/00 (2018.01)
H04N 13/122 (2018.01)
G06T 5/00 (2006.01)
H04N 13/139 (2018.01)

(52) U.S. Cl.
CPC ........... *H04N 13/122* (2018.05); *G06T 5/003* (2013.01); *H04N 13/139* (2018.05); *G06T 2207/10012* (2013.01)

(58) Field of Classification Search
CPC .... H04N 13/00–395; G06T 5/001–003; G06T 2207/10012
See application file for complete search history.

(56) References Cited

U.S. PATENT DOCUMENTS

| 2008/0303894 | A1 | 12/2008 | Ernst et al. | |
|---|---|---|---|---|
| 2012/0038641 | A1 | 2/2012 | Levantovsky | |
| 2012/0287308 | A1* | 11/2012 | Kojima | H04N 5/2621 348/239 |
| 2013/0050544 | A1 | 2/2013 | Kano | |
| 2013/0063571 | A1* | 3/2013 | Ishii | G06T 5/003 348/47 |
| 2013/0343650 | A1 | 12/2013 | Tsutsumi et al. | |
| 2014/0098246 | A1* | 4/2014 | Yi | H04N 5/232 348/207.1 |
| 2015/0379720 | A1 | 12/2015 | Herraez | |
| 2016/0065924 | A1* | 3/2016 | Yokoyama | H04N 5/23212 348/241 |
| 2016/0307368 | A1* | 10/2016 | Akeley | G06T 9/00 |
| 2017/0163972 | A1* | 6/2017 | Kohler | G06F 3/011 |
| 2017/0230638 | A1* | 8/2017 | Wajs | H04N 13/214 |
| 2018/0278915 | A1* | 9/2018 | Ogawa | G06T 7/593 |
| 2018/0350043 | A1* | 12/2018 | Seely | G06T 5/50 |
| 2019/0253609 | A1* | 8/2019 | Miyazaki | G06T 7/50 |
| 2019/0253689 | A1* | 8/2019 | Yanai | G06T 5/003 |

(Continued)

FOREIGN PATENT DOCUMENTS

JP 2009-251839 A 10/2009

*Primary Examiner* — Sean T Motsinger
(74) *Attorney, Agent, or Firm* — Venable LLP

(57) ABSTRACT

A resolution conversion of image data of a photographic image is performed, and based on information related to a distance from a focal plane in the photographic image and the resolution conversion, processing to control the sharpness of an image that the image data resulting from the resolution conversion represents is performed.

15 Claims, 18 Drawing Sheets

(56) References Cited

U.S. PATENT DOCUMENTS

2019/0253690 A1* 8/2019 Yanai .................... H04N 13/139
2020/0007854 A1* 1/2020 Ogawa .................... G06T 5/002
2020/0012908 A1* 1/2020 Miyazaki ................ G06T 5/008
2020/0175651 A1* 6/2020 Zhang ..................... G06T 5/20

* cited by examiner

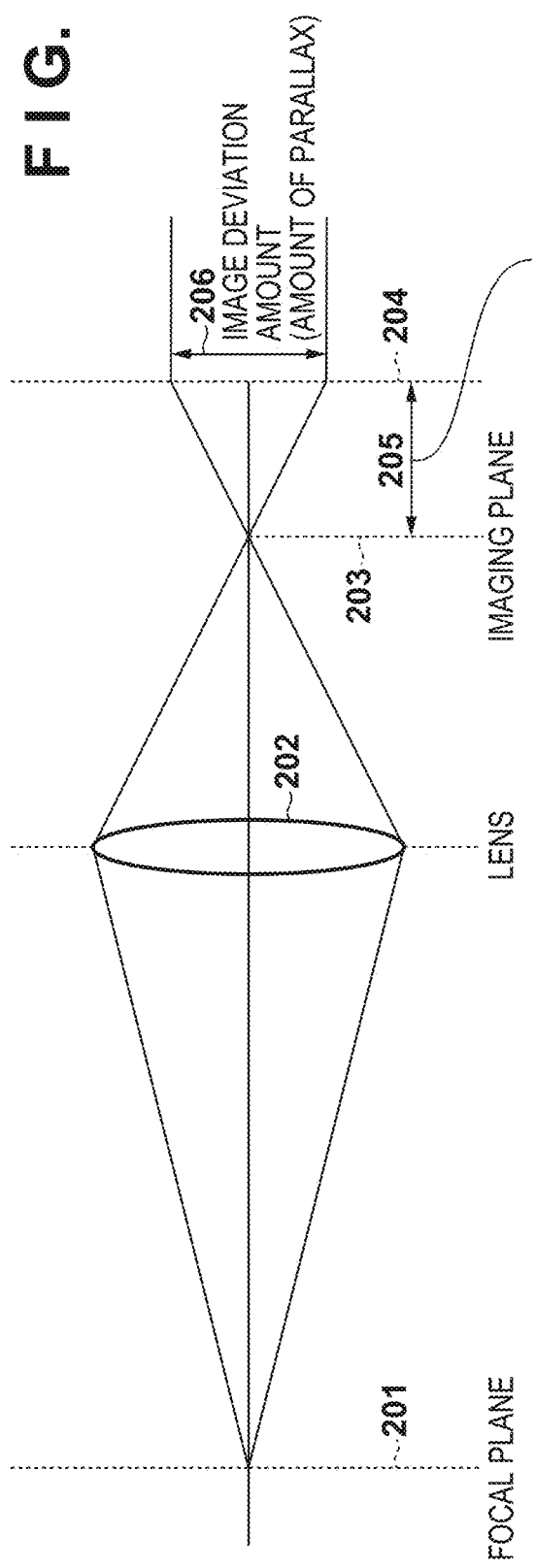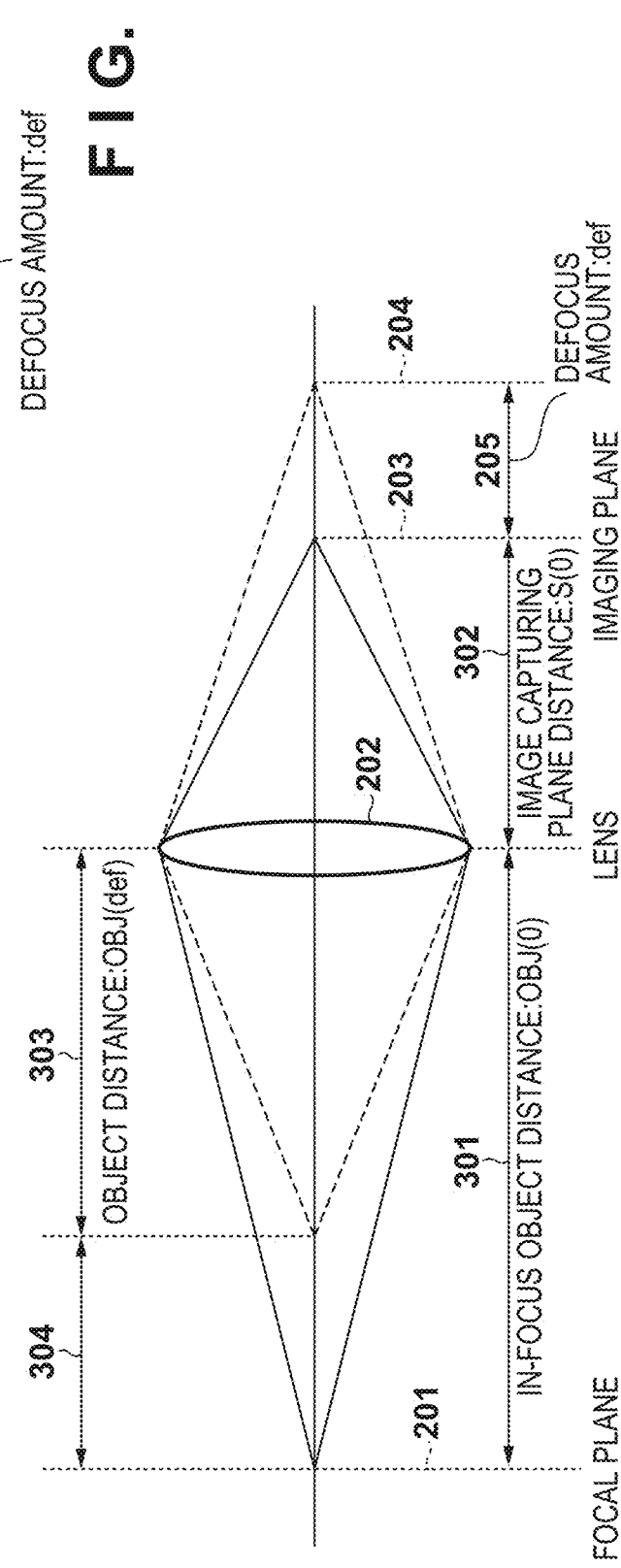

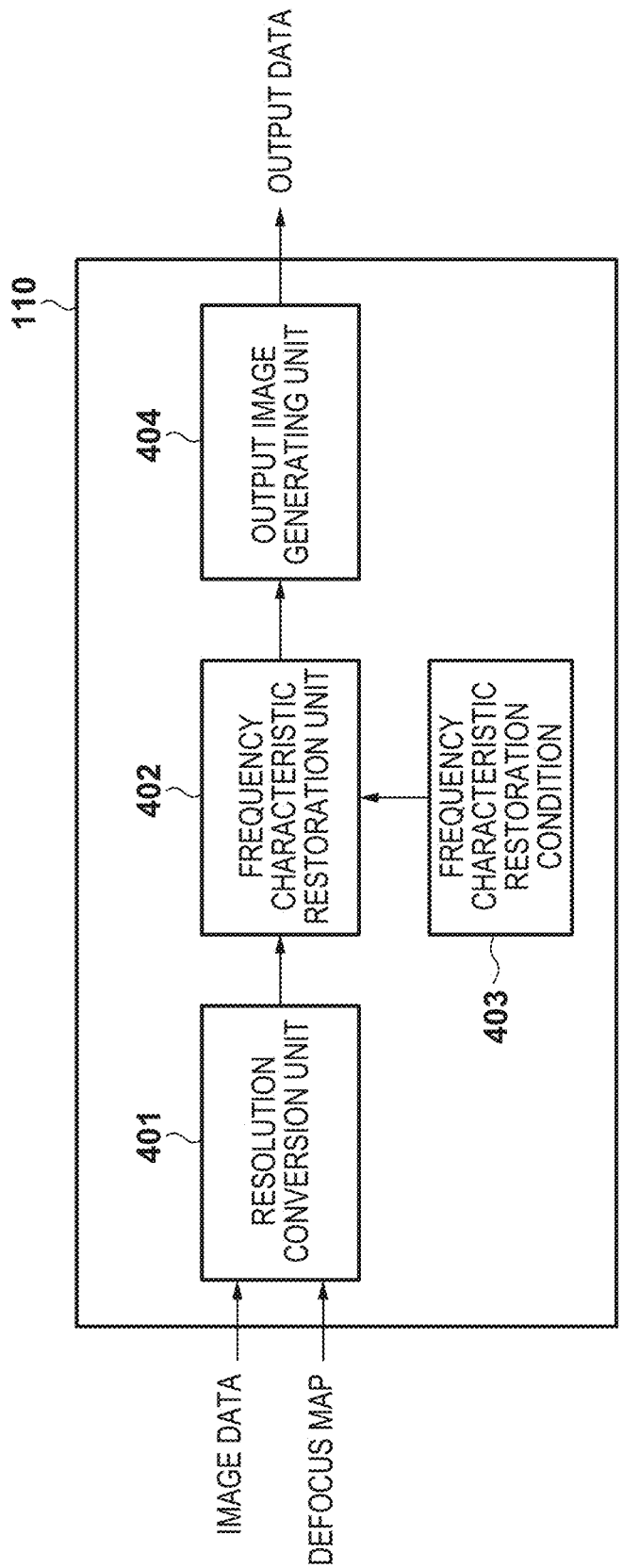

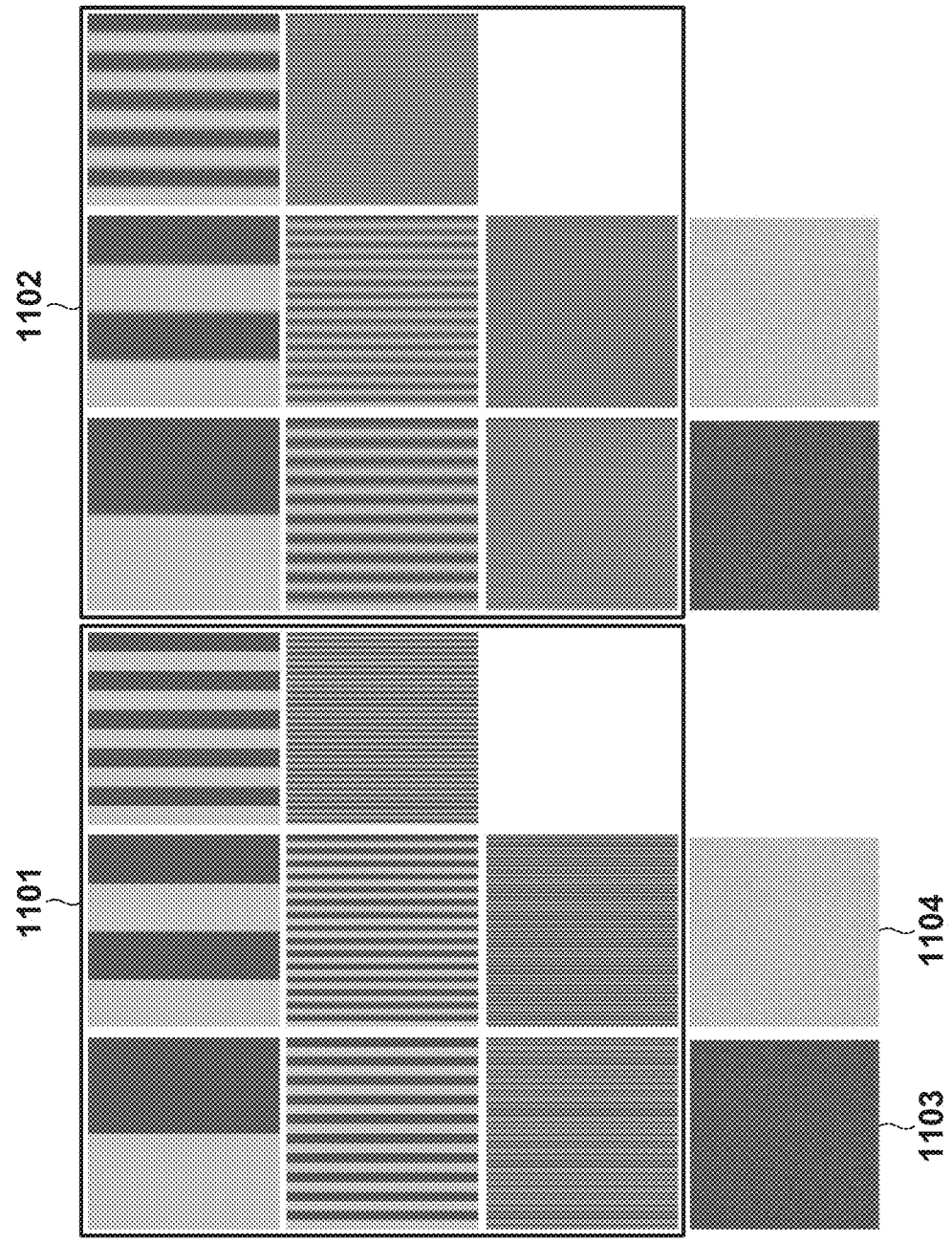

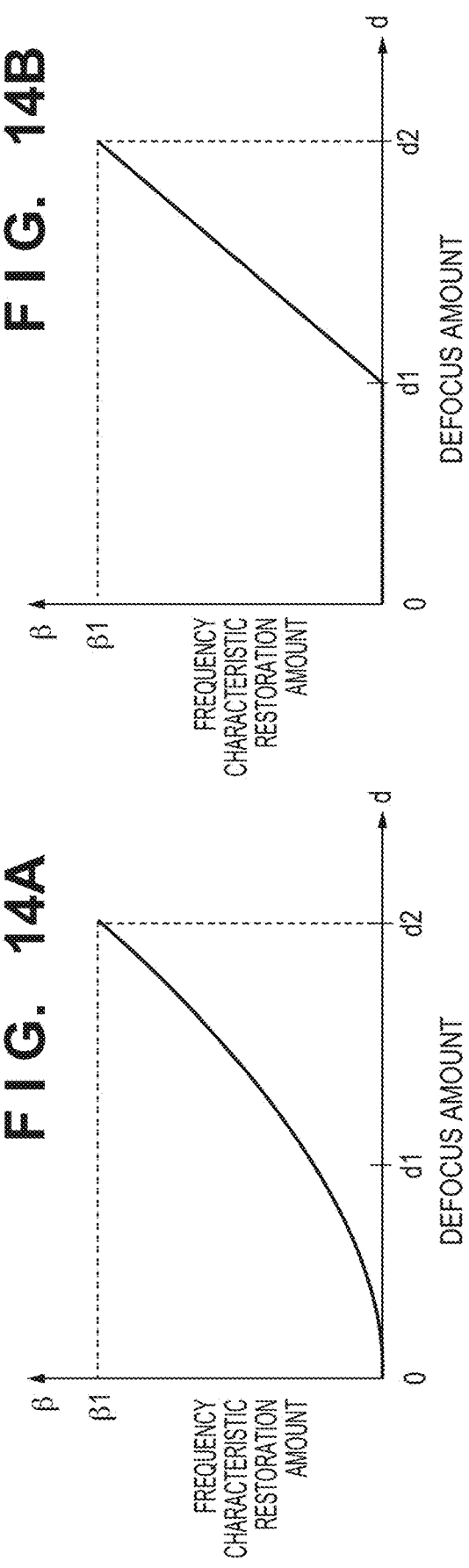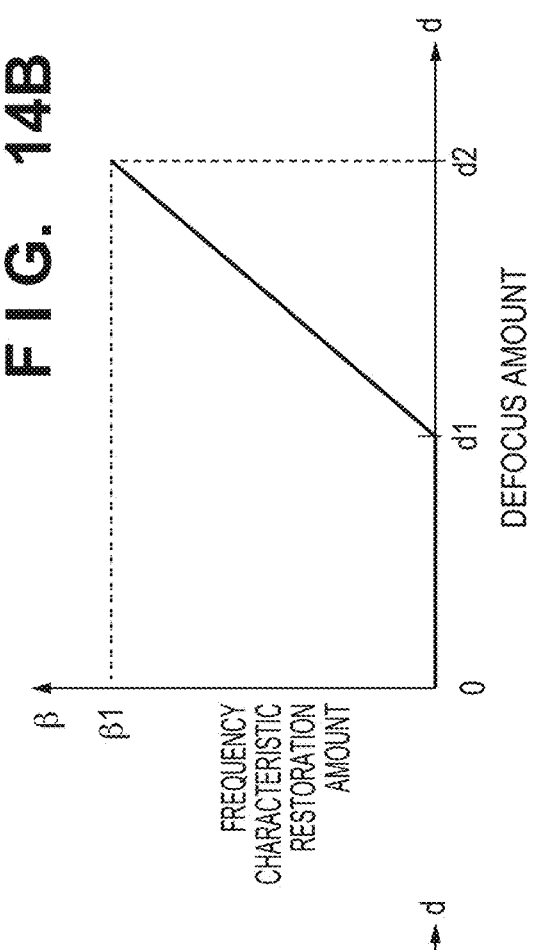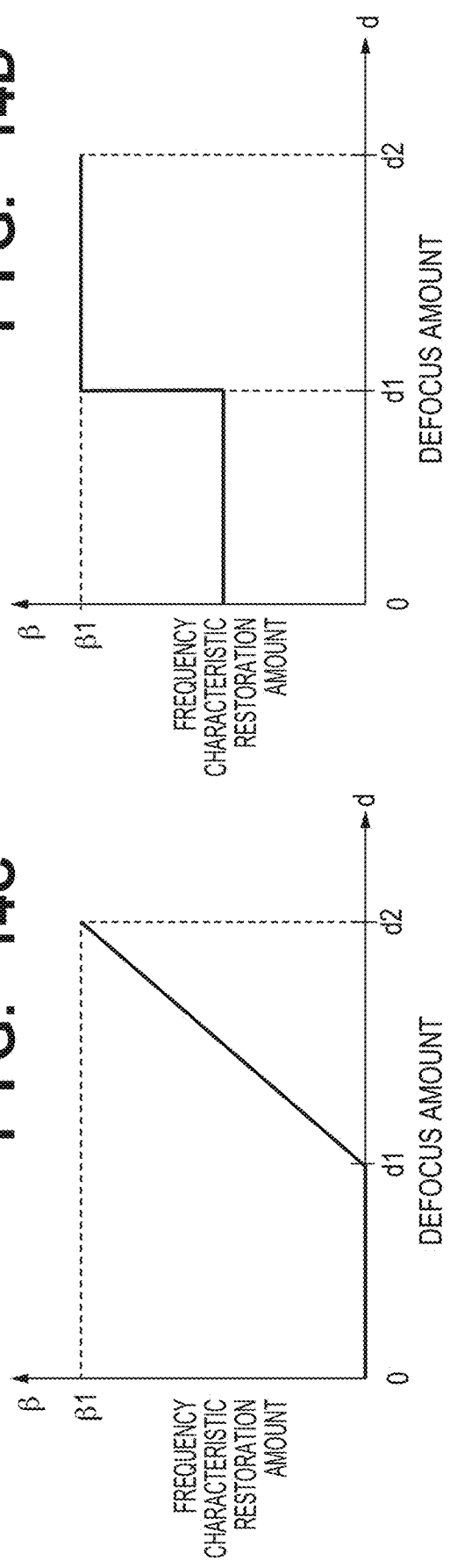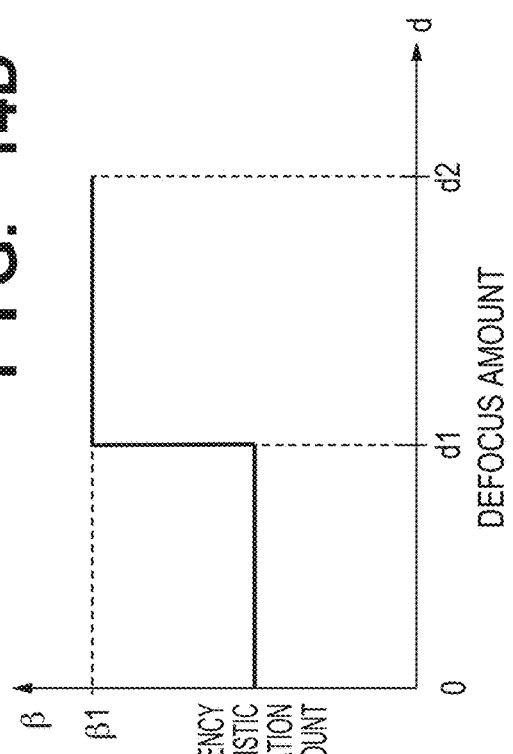

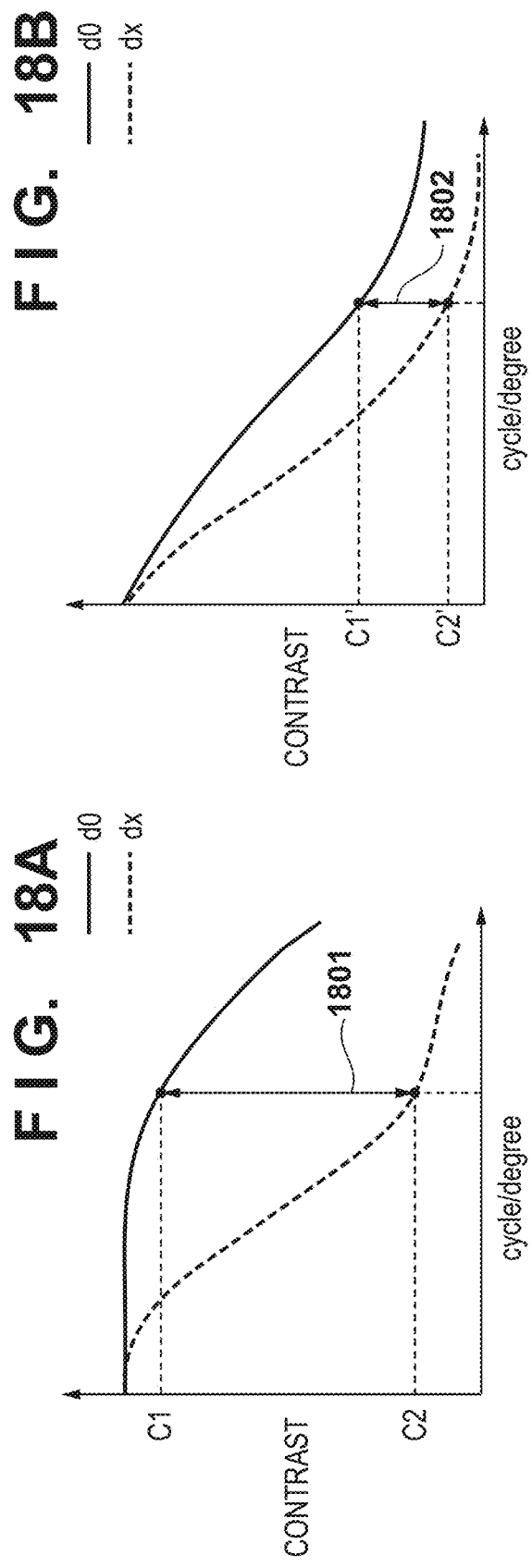
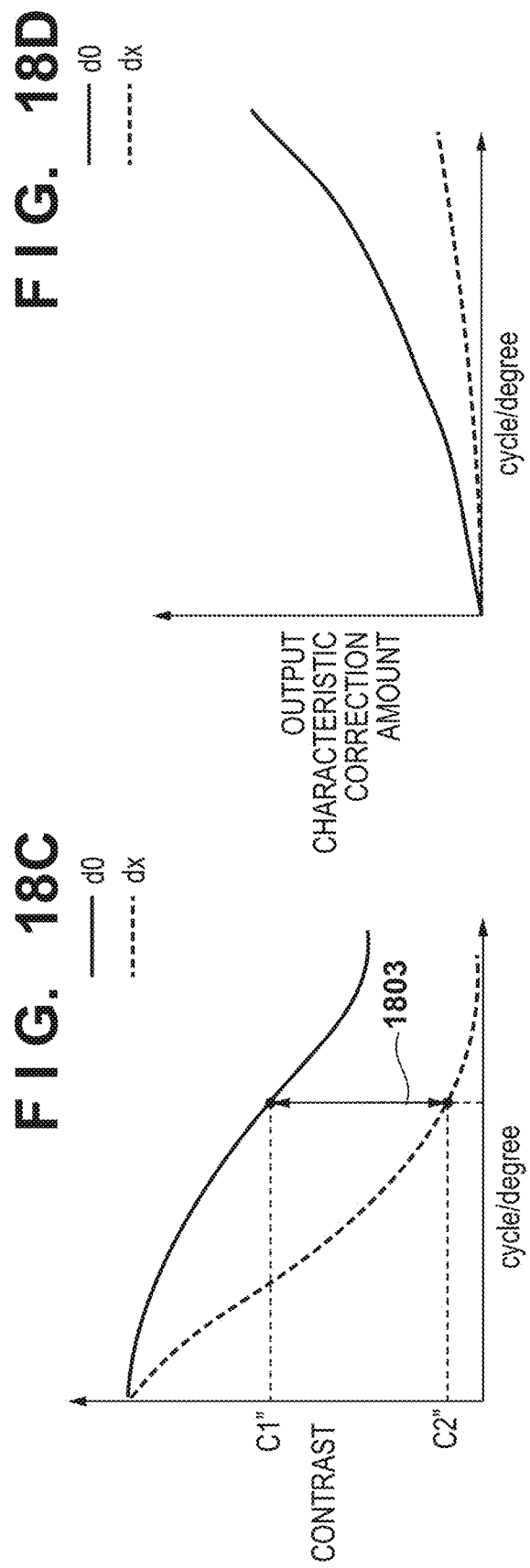

IMAGE PROCESSING APPARATUS, IMAGE PROCESSING METHOD AND STORAGE MEDIUM FOR STORING PROGRAM

BACKGROUND OF THE INVENTION

Field of the Invention

The present invention relates to an image processing apparatus for processing image data, an image processing method, and a storage medium for storing a program.

Description of the Related Art

Humans perceive what they see with their eyes three-dimensionally, and this is thought to be perception by the brain that is based on clues that come from both eyes, clues that come from each eye, and motion disparity. One clue from both eyes is retinal parallax which is a difference between the retinal images in the two eyes. Furthermore, line perspective and object size, gradient of texture, shadow, atmospheric distance and blurring effects, and the like are clues from a single eye. Using one or more of these clues, humans perceive a stereoscopic effect, that is horizontal depth, thickness, and vertical depth, and the anteroposterior relationship of "things".

When viewing a two-dimensional image that was captured by a camera or the like and then displayed, projected, or printed, a stereoscopic effect is perceived in an image from a difference between the degree of blurring between parts that are in-focus and parts that are blurred in accordance with their depth. In other words, the reproduction of parts where the image is in-focus and parts that are not in-focus (that are blurred) is important for the stereoscopic effect.

Meanwhile, methods for, in a laser range finder for example, obtaining distance information for a scene including a subject at the time of capturing have been proposed, such as a method of measuring an actual distance from a capturing location to a target object, a method of measuring a distance from parallax information of two cameras, or the like. Japanese Patent Laid-Open No. 2009-251839 describes a technique for an image quality enhancing method that uses depth information.

Japanese Patent Laid-Open No. 2009-251839 describes processing in which the depth of each position of an image is estimated and calculated from the image, depths and image processing methods are associated, the image processing method is effectively selected as appropriate for each position, and an increase in resolution is achieved while preventing a deterioration in the stereoscopic effect.

However, in Japanese Patent Laid-Open No. 2009-251839, though the stereoscopic effect of the input image itself is controlled, characteristics that influence the sharpness according to the resolution conversion processing at the time of image reproduction have not been considered.

SUMMARY OF THE INVENTION

An aspect of the present invention is to eliminate the above-mentioned problems with the conventional technology. The present invention provides an image processing apparatus for reducing the influence on sharpness of resolution conversion processing, an image processing method, and a storage medium for storing a program.

The present invention in one aspect provides an image processing apparatus, comprising: an input unit configured to input image data of a photographic image; a resolution conversion unit configured to convert a resolution on image data inputted by the input unit; a storage unit configured to store a parameter for reproducing a stereoscopic effect of an image that the image data prior to the resolution conversion represents, wherein the parameter controls a sharpness corresponding to distance information; a processing unit configured to, based on distance information related to a distance from a focal plane in the photographic image and a rate of the resolution conversion, use the parameter stored by the storage unit to process for controlling of a sharpness of the image on data of each pixel of the image data resulting from the resolution conversion; and an output unit configured to output image data resulting from the processing for controlling the sharpness by the processing unit, wherein in a case where the converted resolution is higher than the resolution prior to the resolution conversion by the resolution conversion unit, a degree to which the parameter that the processing unit uses controls the sharpness in a case where a distance corresponding to the distance information is a first distance is larger than a degree to which the parameter that the processing unit uses controls the sharpness in a case where the distance corresponding to the distance information is a second distance larger than the first distance.

By virtue of the present invention, it is possible to reduce the influence on sharpness of resolution conversion processing.

Further features of the present invention will become apparent from the following description of exemplary embodiments with reference to the attached drawings.

BRIEF DESCRIPTION OF THE DRAWINGS

FIG. 2 is a view for describing a relationship between a focal plane when capturing, an image deviation amount, and a defocus amount.

FIG. 3 is a view for describing a method for calculating a distance between the focal plane and an object.

FIG. 4 is a view for illustrating a configuration of an image processing unit.

FIG. 11 is a view for illustrating a measurement chart.

FIGS. 14A through 14D are views for illustrating a relationship between defocus amount and frequency characteristic restoration amount.

FIGS. 18A through 18D are views for describing a change in a relative relationship for sharpness.

DESCRIPTION OF THE EMBODIMENTS

Figure 1:
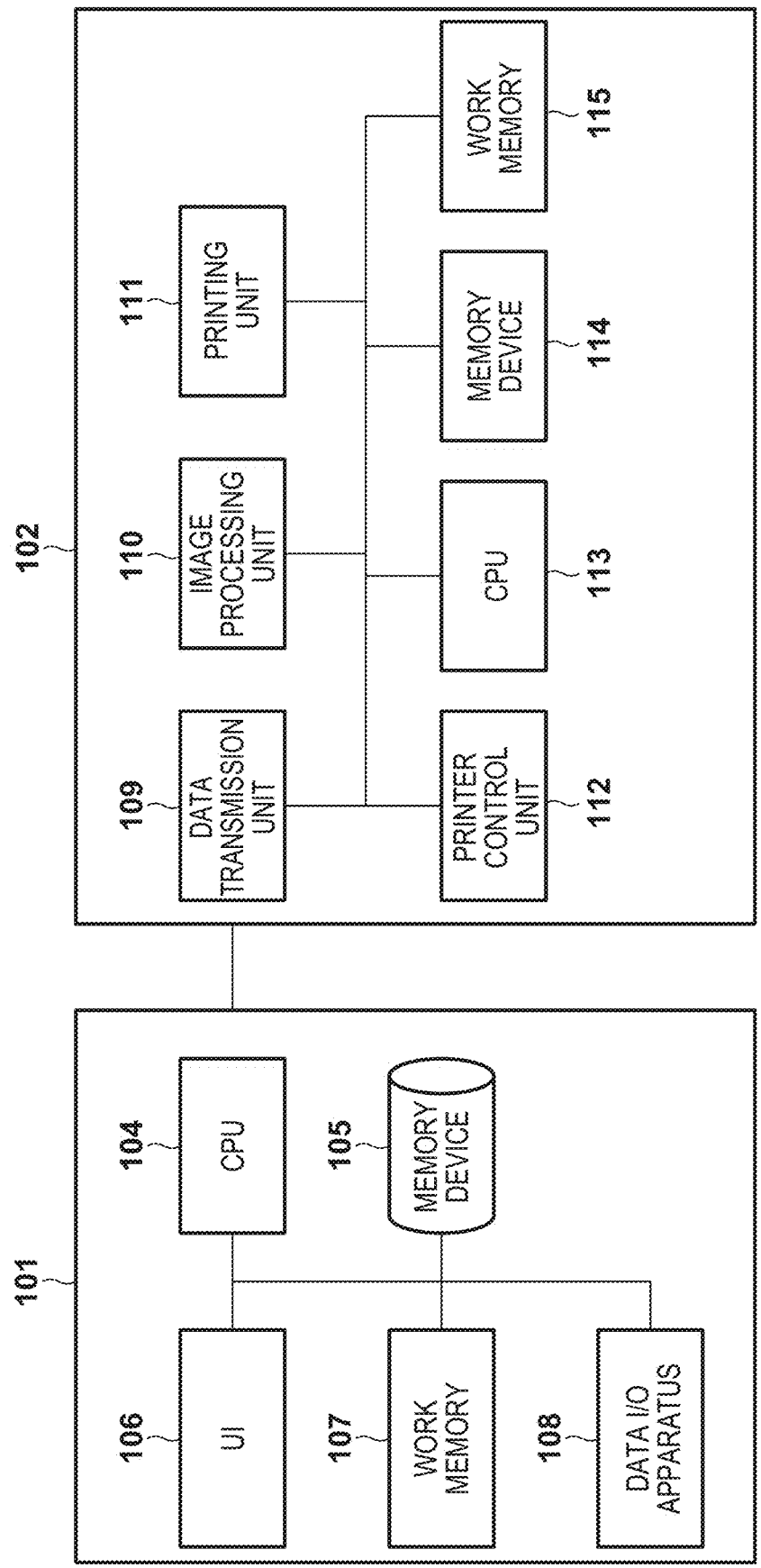
FIG. 1 is a view for illustrating an overall configuration of a print system in which an image processing apparatus is applied.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

First Embodiment

FIG. 1 illustrates an overall configuration of a print system in which an image processing apparatus according to the present embodiment is applied. In the present embodiment, an example in which an ink-jet printer which is an image processing apparatus is applied as an example of an output apparatus will be described. The print system of FIG. 1 includes a personal computer apparatus (PC) 101 (hereinafter referred to as "PC") and an output apparatus 102. The output apparatus 102 is connected to the PC 101 via an interface such as a network, a USB, or a local bus. The PC 101 makes print control instructions to the output apparatus 102, and transfers necessary information and data, and the like. In a memory device 105, an OS, a system program of the present embodiment, and various application software and parameter data necessary for various processing is stored and managed. The memory device 105 is configured by, for example, a hard disk or a flash ROM. A CPU 104 executes processing by using a work memory 107 upon execution of software stored in the memory device 105. A console unit 106 which serves as a user interface (hereinafter referred to as "UI"), regarding execution of the above described processing, accepts input by a user, and performs processing regarding display for the user, and includes an input device such as a keyboard and a pointing device and a display device such as a display. Also, a data I/O apparatus 108 performs input and output of data with respect to an external storage medium such as an SD card. Also, an image capturing apparatus (not shown) may be directly connected to the data I/O apparatus 108 or a data transmission unit 109, and data may be transferred without going through an external storage medium.

The output apparatus 102 includes the data transmission unit 109, a printer control unit 112, an image processing unit 110, and a printing unit 111, and receives print data from the PC 101. In the present embodiment, the print data is configured to includes input image data which is a photographic image acquired by capturing a subject by the image capturing apparatus which may be camera, information corresponding to a distance from the focal plane at the time of capture corresponding to the input image data, image processing parameters, printer control data, and print information data of a printing medium or a print quality that a user selected on a UI. "Printing medium" means, for example, a paper medium. Also, the output apparatus 102 includes a CPU 113, a memory device 114, and a work memory 115. Regarding the output apparatus 102, by reading a program stored in the memory device 114 into the work memory 115 and executing the program, the output apparatus 102 is comprehensively controlled.

The information corresponding to the distance from the focal plane at the time of capture is a defocus amount and an image deviation amount, or the actual distance from the focal plane to an object. These will be described as data generated by the image capturing apparatus which may be a camera in the present embodiment, but limitation is not made to these, and there may also be data generated from information for which the distance was actually measured. Also, there may be data generated as the result of analyzing a blurring amount of input image data, for example, or other data that is used in combination with data for when capturing.

Input image data and information corresponding to the distance from the focal plane may be generated by the image capturing apparatus, and may be generated by the PC 101 or the output apparatus 102 connected to the image capturing apparatus. Also, information for generating the information corresponding to the distance from the focal plane may be obtained from the image capturing apparatus, and information corresponding to the distance from the focal plane may be generated in the PC 101 or the output apparatus 102 connected to the image capturing apparatus. Also, configuration may be taken such that the image capturing apparatus is connected to the PC 101, and information for generating the information corresponding to the distance from the focal plane is obtained in the output apparatus 102 via the PC 101 and the information corresponding to the distance from the focal plane is generated in the output apparatus 102. Here, the information for generating the information corresponding to the distance from the focal plane is, for example, a pair of images obtained by respectively photoelectrically converting light that passed through different regions of an exit pupil of an image capturing lens.

The data transmission unit 109 retrieves the input image data, the data corresponding to the distance from the focal plane at the time of capture, and the image processing parameters from the print data sent from the PC 101, sends them to the image processing unit 110, and sends printer control data to the printer control unit 112. The input image data is data resulting from resizing to a size of printing medium set by a user by resolution conversion processing stored as a program in the memory device 105 in the PC 101. Also, the resolution conversion processing is performed in the image processing unit 110 of the output apparatus 102. Also, in the present embodiment, the image processing unit 110 is within the output apparatus 102, but it may be configured within the PC 101.

Also, image processing parameters and printer control data may be stored in the memory device 105 within the PC 101 and may be stored in a non-illustrated memory device (a hard disk, a ROM, or the like) in the output apparatus 102. Configuration may be such that these are selected based on the print information data in the print data, and are sent to the image processing unit 110 and the printer control unit 112. The printer control unit 112 controls operation of the printing unit 111 in accordance with the printer control data. In the present embodiment, printing in the printing unit 111 is performed by an inkjet printing method.

FIG. 2 is a view for describing a relationship between a focal plane when capturing, an image deviation amount, and a defocus amount. A focal plane 201 is a plane of focus that is parallel with an imaging plane (image capturing plane) 203 in the image capturing apparatus. Also, a defocus amount 205 is a difference (difference between a planned image forming plane and an actual image forming plane) between the image capturing plane and a defocused image capturing plane position 204, and is proportional to the blurring amount. The defocus amount 205 is detected in the image capturing apparatus using a pupil-dividing phase difference detection method or a plurality of images for which blurring differs. For example, the defocus amount 205 may be calculated from the image deviation amount (amount of parallax) 206 of an image. Correlation values are calculated while shifting data relatively for a pair of pieces of pixel data obtained by respectively photoelectrically converting light that passed through different regions of an exit pupil of an image capturing lens, and making the image shift amount 206 at which the correlation is the highest the amount of parallax. Furthermore, by using a conversion coefficient decided in accordance with a pixel pitch and a lens of an image capturing element in relation to the calculated image shift amount 206, the defocus amount 205 of a subject imaging plane in relation to the planned image forming plane is calculated.

Also, the defocus amount may be calculated by a DFD (Depth From Defocus) method. In the DFD method, a plurality of images among which blurring differs are obtained by controlling capturing parameters of an image capturing optical system, and a measurement target pixel and peripheral pixels thereof are used to calculated an amount of correlation of blurring therebetween among the plurality of obtained images, to thereby calculate the defocus amount.

Next, using FIG. 3, a method for calculating the distance between the focal plane and the object will be described. In FIG. 3, a distance 301 is an in-focus object distance OBJ(0) and a distance 302 is an image capturing plane distance S(0) corresponding to an in-focus image object. Also, a distance 303 is an object distance OBJ(def), and a distance 304 is a distance from the focal plane to the object. According to the lens formula, the following Equations (1) and (2) hold, and therefore it is possible to calculate the object distance OBJ(def) by the following Equation (3).

$$1/OBJ(0)+1/S(0)=1/f \quad (1)$$

$$1/OBJ(def)+1/(S(0)+def)=1/f \quad (2)$$

$$OBJ(def)=[(S(0)+def)*f]/[(S(0)-def)*f] \quad (3)$$

By subtracting the object distance calculated by Equation (3) from the in-focus object distance, the distance 304 from the focal plane to the object is calculated. The above-described information corresponding to the distance from the focal plane is information that is proportional to the distance from the focal plane. For that reason, any of the above-described image shift amount 206, defocus amount 205, and distance 304 from the focal plane may be the information corresponding to the distance from the focal plane.

Figure 5A:
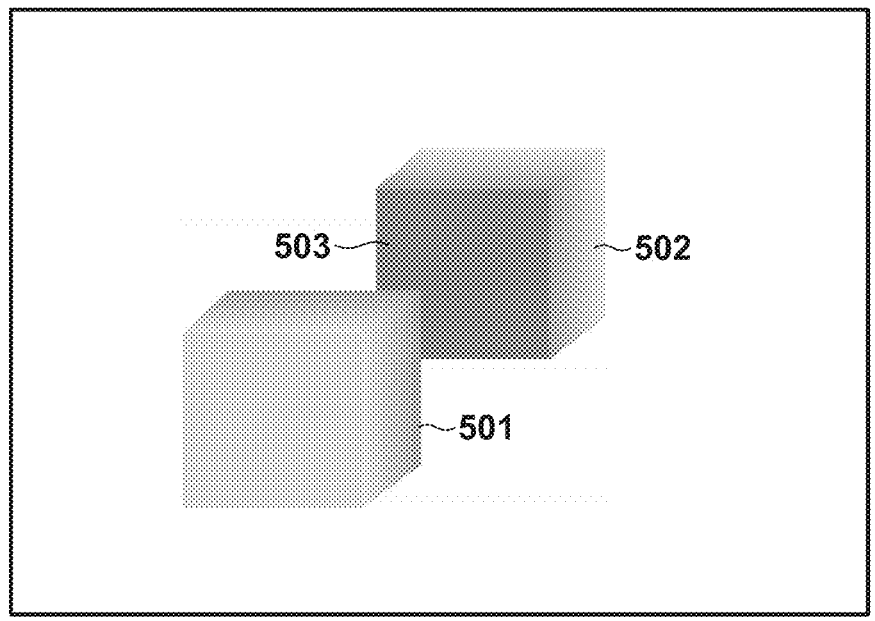
FIGS. 5A and 5B are views for describing a defocus map.

Next, description of a defocus map will be given. A defocus map maps the defocus amount 205 described above at a plurality of locations on input image data, and FIG. 5A illustrates an example of a defocus map. In the present embodiment, FIG. 5A illustrates a defocus map corresponding to input image data in which two cubes 501 and 502 are captured, and information of the defocus amount 205 corresponding to each pixel of the input image data is held.

Figure 5B:
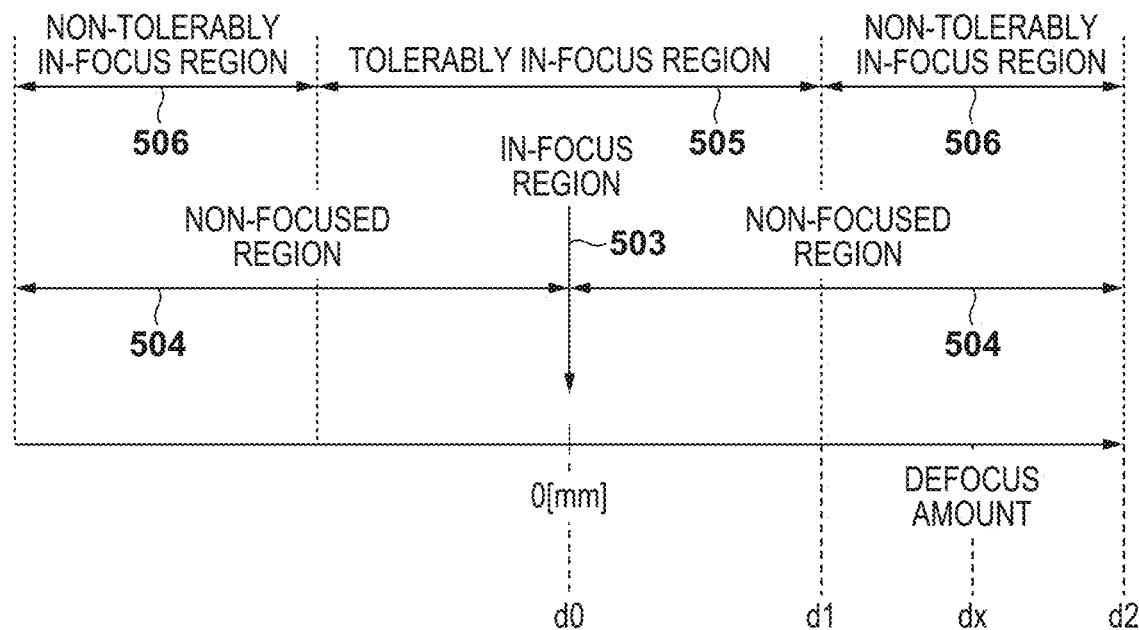

FIG. 5B is a view for describing a correspondence between the defocus amount 205 and each region used in the present embodiment. The value "0" of the defocus amount 205 is the defocus amount 205 corresponding to the focal plane when capturing in FIG. 5B, and corresponds to the blackest part (the region 503) of FIG. 5A. The further from the value "0" that the defocus amount 205 is, the whiter the corresponding part is in FIG. 5A. In the defocus map of FIG. 5A, the region of the value "0" of the defocus amount 205 corresponds to the region 503, and is an image region that is in-focus (focal plane). Below, the region 503 will be referred to as the in-focus region. In the present embodiment, regions other than the region 503 are regions that do not correspond to the focal plane on the defocus map, and are referred to as non-focused regions 504. The defocus amount d1 is a value at the boundary between a tolerably in-focus region 505 and a non-tolerably in-focus region 506. Furthermore, the defocus amount d2 is the maximum defocus amount included in the defocus map. The defocus amount dx represents a specific defocus amount between the defocus amounts d1 and d2.

Also, in the present embodiment, a region where the focus is tolerable is referred to as a tolerably in-focus region 505. The tolerably in-focus region 505 may define the range of a depth of field, and may be defined arbitrarily by subject experiment. Also, regions other than the tolerably in-focus region 505 are regions that are not a tolerably in-focus region 505 and are referred to as a non-tolerably in-focus region 506. In FIG. 5B, the defocus amount 205 is the abscissa, but the above-described image shift amount 206 and the distance 304 from the focal plane, which is information corresponding to the distance from the focal plane, may be used. Also, in the present embodiment, the in-focus region 503 and the tolerably in-focus region 505 are generic terms for regions that are determined to be in-focus, and the non-focused region 504 and the non-tolerably in-focus region 506 are generic terms for regions that are determined to not be in-focus.

The configuration of the image processing unit 110 in the present embodiment is illustrated in FIG. 4. Also, with reference to the flowchart of FIG. 6, image processing in the present embodiment will be described. The image processing unit 110 obtains (step S601) input image data, and obtains (step S602) the above-described defocus map as information corresponding to the distance from the focal plane at the time of capture. Next, a resolution conversion unit 401 changes (step S603) the number of pixels of the input image data in accordance with the number of pixels of the output image data. Common image magnification or reduction processing is used to change the number of pixels of the input image data in the resolution conversion unit 401. For example, a bilinear method that adds pixels by averaging the peripheral pixel values of a target pixel or a bi-cubic method that adds pixels by interpolation from peripheral pixel values of a target pixel may be used, but limitation is not made thereto if an image re-sampling method is used. In the resolution conversion unit 401, a resolution conversion is similarly performed in accordance with the number of pixels of the output image data for the defocus map.

Next, a frequency characteristic restoration unit 402 obtains (step S604) a frequency characteristic restoration condition 403, and based on the defocus map obtained in step S602, performs (step S605) restoration processing for a frequency characteristic in relation to input image data after the resolution conversion processing. Details of the processing in the frequency characteristic restoration unit 402 are described later. Also, the frequency characteristic restoration condition 403 is stored in a memory device (hard disk, ROM, or the like) in the output apparatus 102.

Next, an output image generating unit 404, in relation to output image data (RGB) outputted from the frequency characteristic restoration unit 402, generates (step S606) data for printing by a printhead of an ink-jet printer. For example, first, color conversion processing for converting device-independent RGB data into device-dependent RGB data is executed, and ink color separation processing for converting from the device-dependent RGB data into ink color data is executed. Furthermore, tone correction processing for performing a tone correction to linearly associate tone characteristics of the printing apparatus, halftone processing for converting ink color data into ink-dot ON/OFF information, and the mask data conversion processing for generating binary data to be printed in a print scan by a printhead is executed. Since these are all common processes in ink-jet printers, detailed description thereof will be omitted. Output data generated by the output image generating unit 404 is sent to the printing unit 111, and printed (step S607) on a printing medium.

[Stereoscopic Effect in Image after Resolution Conversion]

Here, resolution conversion processing that affects the sharpness of an output image after a resolution conversion, and a stereoscopic effect according to restoration of frequency characteristics will be described. Humans perceive a sense of depth and a stereoscopic effect in an image from a difference in sharpness between a tolerably in-focus regions including the in-focus regions which are in-focus (focused) and non-tolerably in-focus regions which are not in-focus (are blurred) when viewing a two-dimensional image captured by a camera or the like. Meanwhile, in the case where an image is outputted through an output apparatus such as a printer, the sharpness of the image deteriorates due to resolution conversion processing that magnifies or reduces the input image data to the printing medium size (print size), for example. Similarly, in a display or projector, the sharpness of an image deteriorates in the output image.

The change in the sharpness of the input image due to such resolution conversion processing changes greatly in a tolerably in-focus regions which are in-focus and hardly changes or does not change in a non-tolerably in-focus region with low sharpness, i.e. that are blurred in the input image. In other words, the amount of change of the sharpness differs between tolerably in-focus regions and non-tolerably in-focus regions. For this reason, the relative relationship in sharpness between the tolerably in-focus regions and the non-tolerably in-focus regions which affects the stereoscopic effect in the input image is not maintained in the output image.

Figure 7A:
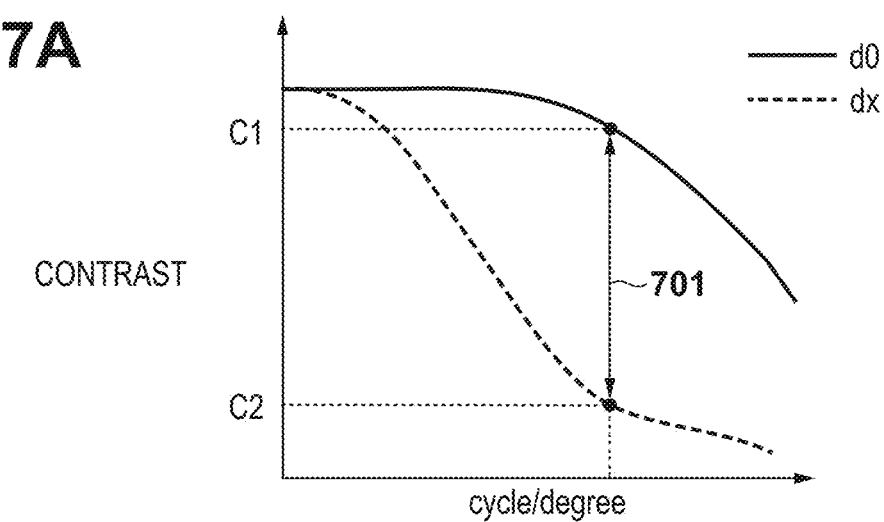
FIGS. 7A through 7C are views for describing a change in a relative relationship for sharpness.

Further description will be given with reference to FIG. 7. Note that in order to simplify the description for FIG. 7, description will be given using an example of an image that has the same frequency peak in the spatial frequency characteristics of an image corresponding to a particular defocus amount included in a non-focused region and the spatial frequency characteristics of an image in an in-focus region. Also, in the present embodiment, a magnification process is performed to scale to the printing medium size, and to make a characteristic at a time of outputting using a printer be an output characteristic. Here, an example of a case in which an image magnification process is executed in the resolution conversion processing is given. Assume that in input image data which has the stereoscopic effect due to blurring, for example, there is a relationship as illustrated in FIG. 7A between a contrast value C1 which indicates a sharpness of the in-focus region and a contrast value C2 which indicates a sharpness of a non-focused region of the input image data, for a particular spatial frequency. In this case, when the input image is magnified by the resolution conversion unit 401, the contrast values C1 and C2 are changed to C1' and C2' as illustrated in FIG. 7B.

Figure 7B:
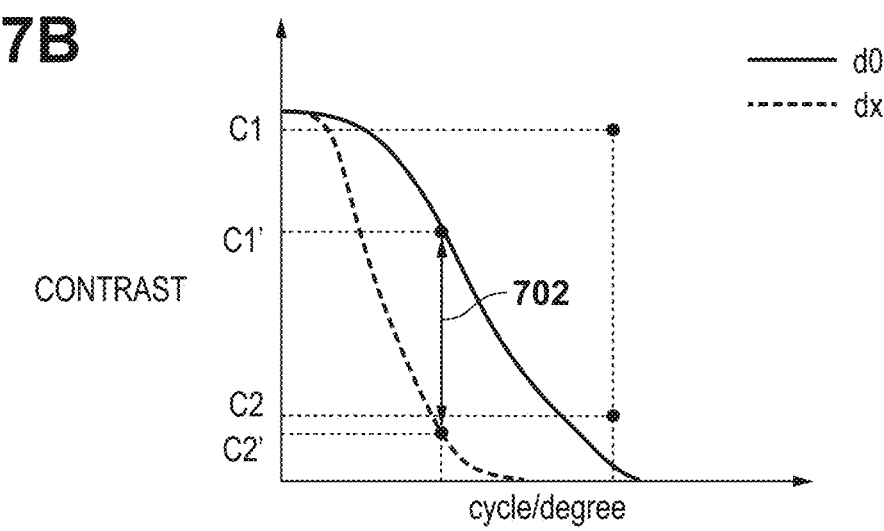

As is clear from FIGS. 7A and 7B, the amount of change in the sharpness of the input image data due to the resolution conversion processing differs between the in-focus region and the non-focused region. In other words, the difference (the relationship 702 of the contrast values C1' and C2') in sharpness, which affects the stereoscopic effect, is less than the difference (the relationship 701 between the contrast values C1 and C2) in sharpness for the input image data, and an output image with an appropriate stereoscopic effect is not achieved. Thus, by appropriately restoring the frequency characteristic of the image after the resolution conversion processing to control the sharpness based on the state of blurring in the image corresponding to the previously-described defocus amount 205 and the change in the frequency characteristic due to the resolution conversion processing which affects the sharpness of the output image, it is possible to achieve an output image with a stereoscopic effect.

Figure 7C:
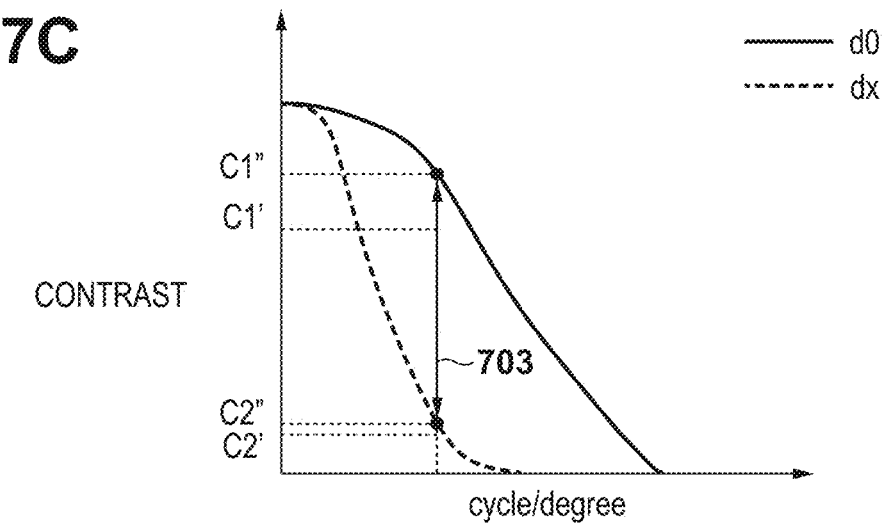

In the output image resulting from appropriately controlling the sharpness of the image by using the frequency characteristic restoration amount according to the defocus amount 205 set in a later-described frequency characteristic restoration condition 403, the relationship of contrast values between the above-described in-focus region and non-focused region, is respectively C1" and C2" as illustrated in FIG. 7C. As illustrated in FIG. 7C, the difference (the relationship 703 between the contrast values C1" and C2") in sharpness in the output image resulting from execution of the frequency characteristic restoration processing based on the frequency characteristic restoration condition 403 of the present embodiment is larger than the difference (the relationship 702 between the contrast values C1' and C2') in sharpness in the case where the frequency characteristic restoration processing is not executed. Accordingly, it is possible to achieve an appropriate stereoscopic effect since the difference (the relationship 701 between the contrast values C1 and C2) in sharpness in the input image is approached.

In FIG. 7, to simplify the description, the contrast corresponding to two points of the spatial frequency of an image of an in-focus region and the spatial frequency of an image corresponding to a particular defocus amount 205 included in a non-focused region are compared. Limitation is not made to this, and it is similar for images corresponding to an in-focus region and another defocus amount 205 of a non-focused region. Also, it is similar even for two points between an image corresponding to a particular defocus amount 205 included in a tolerably in-focus region and an image corresponding to a particular defocus amount 205 included in a non-tolerably in-focus region.

Contrast values are used as the image characteristic that affects the sharpness of the image, but the same relationship can be described even for a spatial frequency characteristic that indicates sharpness for a change in the sharpness of an image between an in-focus region and a non-focused region according to an output characteristic of the output apparatus 102.

Figure 8A:
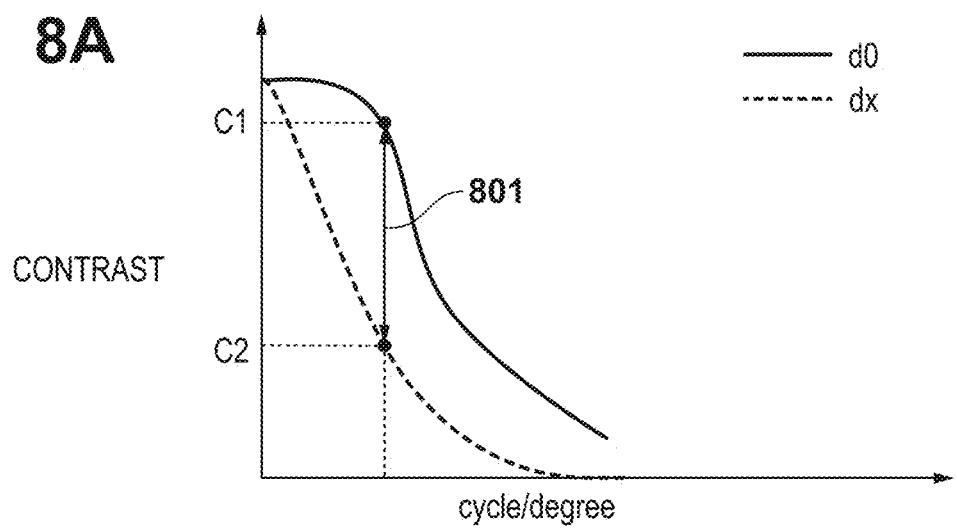
FIGS. 8A through 8C are views for describing a change in a relative relationship for sharpness.
Figure 8B:
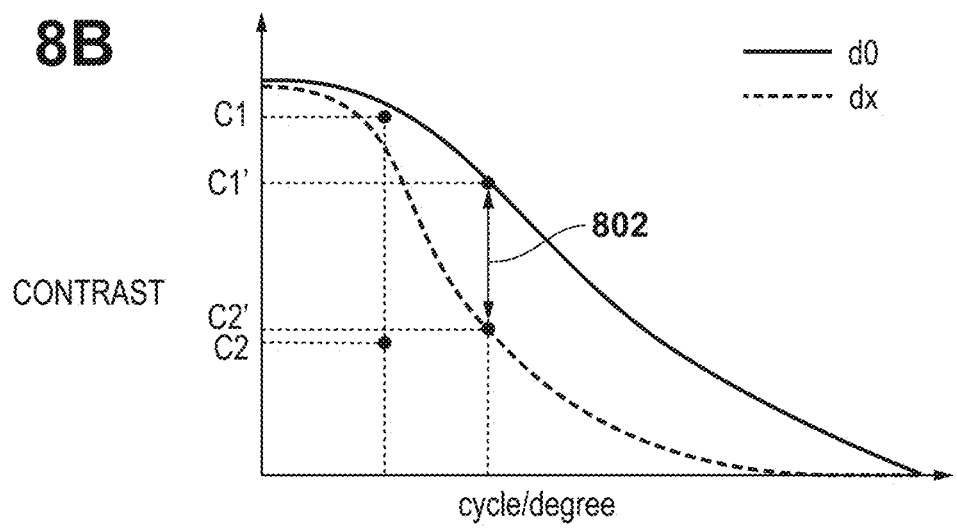
Figure 8C:
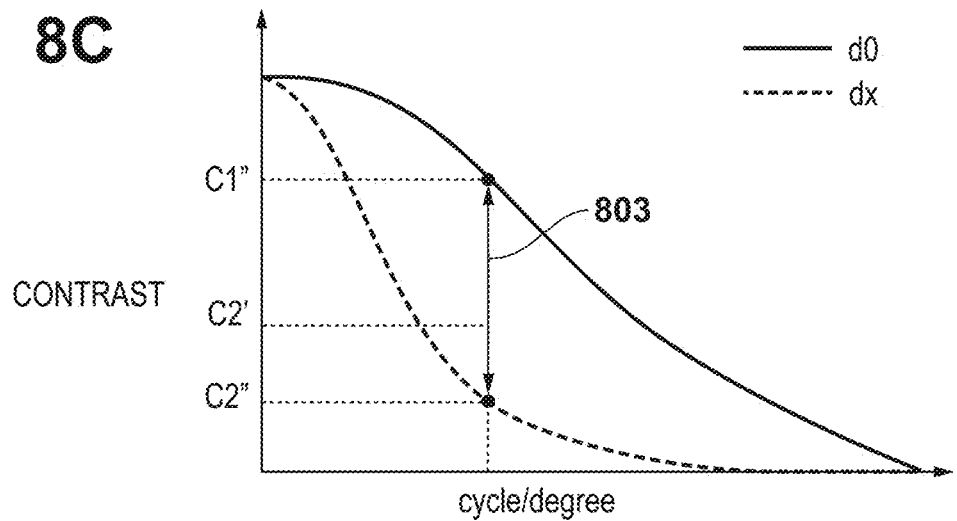

Similarly, the contrast relationship between the in-focus region and the non-focused region when image reduction processing is executed in the resolution conversion processing will be described. FIG. 8A is a view that illustrates a relationship, for an input image, between the contrast value C1 which indicates the sharpness of an in-focus region of input image data for a particular spatial frequency and the contrast value C2 which indicates the sharpness of a non-focused region. FIG. 8B is a view illustrating a relationship in a case where the input image is reduced by the resolution conversion unit 401. FIG. 8C is a view illustrating a relationship in a case where the frequency characteristic restoration processing is executed in the present embodiment. Assume that in input image data which has the stereoscopic effect due to blurring, for example, there is a relationship as illustrated in FIG. 8A between a contrast value C1 which indicates a sharpness of the in-focus region and a contrast value C2 which indicates a sharpness of a non-focused region of the input image data for a particular spatial frequency. Thus, when the input image is reduced by the resolution conversion unit 401, as illustrated in FIG. 8B, the contrast values C1 and C2 are changed to C1' and C2', resulting in an output image in which an appropriate stereoscopic effect is not achieved.

Meanwhile, in the output image resulting from appropriately controlling the sharpness by using the frequency characteristic restoration amount according to the defocus amount 205 set in the later-described frequency characteristic restoration condition 403, the relationship of contrast values between the in-focus region and non-focused region is respectively C1" and C2" in FIG. 8C. The difference (the relationship 803 between the contrast values C1" and C2") in sharpness in the output image resulting from execution of the frequency characteristic restoration processing based on the frequency characteristic restoration condition 403 of the present embodiment is larger than the difference (the relationship 802 between the contrast values C1' and C2') in sharpness in the case where the frequency characteristic restoration processing is not executed. Thus, it is possible to achieve an appropriate stereoscopic effect in the image after the reduction processing since the difference (the relationship 801 between the contrast values C1 and C2) in sharpness in the input image is approached.

In FIG. 8, to simplify the description, the contrast corresponding to two points of the spatial frequency of an image of an in-focus region and the spatial frequency of an image corresponding to a particular defocus amount 205 included in a non-focused region are compared. Limitation is not made to this, and it is similar for images corresponding to an in-focus region and another defocus amount 205 of a non-focused region. Also, it is similar even for two points between an image corresponding to a particular defocus amount 205 included in a tolerably in-focus region and an image corresponding to a particular defocus amount 205 included in a non-tolerably in-focus region.

Figure 9A:
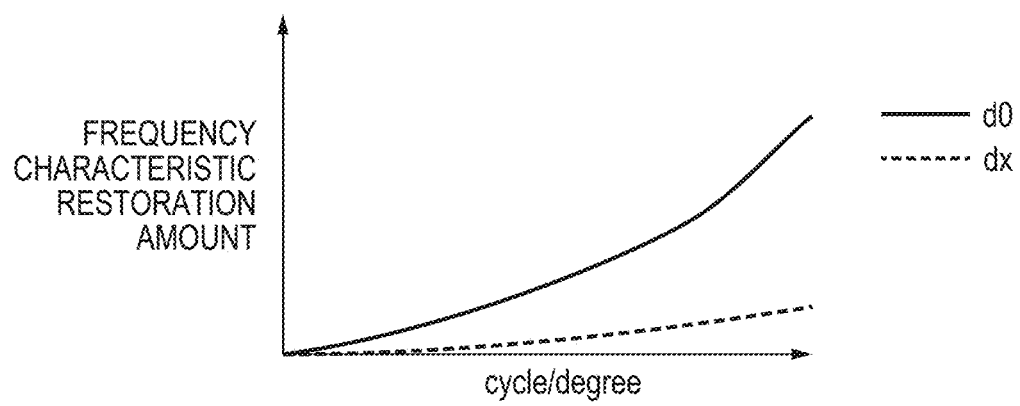
FIGS. 9A and 9B are views for illustrating a relationship between spatial frequency and a frequency characteristic restoration amount.
Figure 9B:
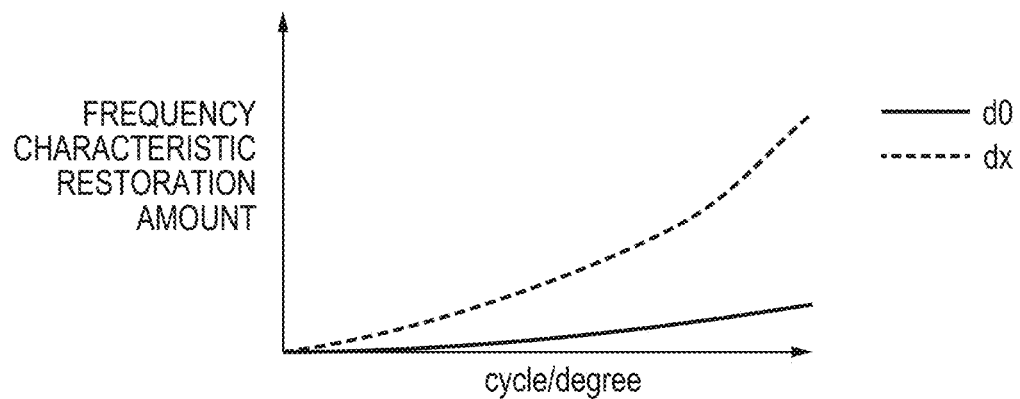

Thus far, it has been described that the stereoscopic effect is lost in relation to the input image due to the conversion of the frequency characteristic (sharpness) of the image by the resolution conversion processing, but by appropriately restoring the frequency characteristic of the in-focus region and the non-focused region, an appropriate stereoscopic effect is imparted to the output image. When focusing on the restoration amounts of the in-focus region and the non-focused region in the frequency characteristic restoration processing in the frequency characteristic restoration unit 402, the relationship illustrated in FIG. 9A corresponds to the case where the resolution conversion processing is a magnification process. Also, the relationship illustrated in FIG. 9B for the frequency characteristic restoration amounts of the in-focus region and the non-focused region corresponds to the case where the resolution conversion processing is reduction processing.

In other words, in the case of a resolution conversion by the resolution conversion unit 401 that increases the number of pixels, when a tolerably in-focus region of an image including the focal plane and a non-tolerably in-focus region are compared, the restoration amount of the tolerably in-focus region is larger than the restoration amount of the spatial frequency characteristic of the non-tolerably in-focus region. Furthermore, in the case of a resolution conversion by the resolution conversion unit 401 that decreases the number of pixels, when a tolerably in-focus region of an image including the focal plane and a non-tolerably in-focus region are compared, the restoration amount of the tolerably in-focus region is smaller than the restoration amount of the spatial frequency characteristic of the non-tolerably in-focus region.

[Frequency Characteristic Restoration Processing]

The frequency characteristic restoration processing will be described. The frequency characteristic restoration unit 402 controls the spatial frequency characteristic which affects the sharpness of the input image data by a control parameter set in the frequency characteristic restoration condition 403. In the frequency characteristic restoration condition 403, a frequency characteristic restoration amount is set for each defocus amount 205.

FIG. 10 illustrates a relationship between the defocus amount 205 and a sharpness control amount set in the frequency characteristic restoration condition 403. A method for generating the frequency characteristic restoration condition 403 will be described later. The frequency characteristic restoration unit 402, in the case where the resolution conversion processing is image magnification processing, applies a sharpness control amount set in the frequency characteristic restoration condition 403 while referencing the defocus amount 205 of the same coordinate position of the defocus map in relation to the luminance information of the processing target pixel. For example, sharpness processing is performed by using the Laplacian of Gaussian filter of Equation (4) and an unsharp mask. Equation (5) expresses a conversion formula of the luminance information I(x, y) of the input image data for when the Laplacian of Gaussian filter of Equation (4) is used. Out(x, y) expresses image data after the stereoscopic effect control processing, and β expresses a frequency characteristic restoration amount in relation to the defocus amount 205 set in the frequency characteristic restoration condition 403.

$$h(x,y)=(x^2+y^2-2\sigma^2)/(2\pi\sigma^2)\exp[-x^2+y^2)/(2\sigma^2)] \quad (4)$$

$$Out(x,y)=I(x,y)-\beta \times h(x,y) \times I(x,y) \quad (5)$$

In FIG. 10, β=β1 when the defocus amount d=0 indicates the sharpness control amount (hereinafter simply referred to as the control amount) in relation to an in-focus region of an input image. Also, the defocus amount d1 is a value at the boundary between a tolerably in-focus region 505 and a non-tolerably in-focus region 506 as illustrated in FIG. 5B. Furthermore, the defocus amount d2 is the maximum defocus amount included in the defocus map.

Figure 10A:
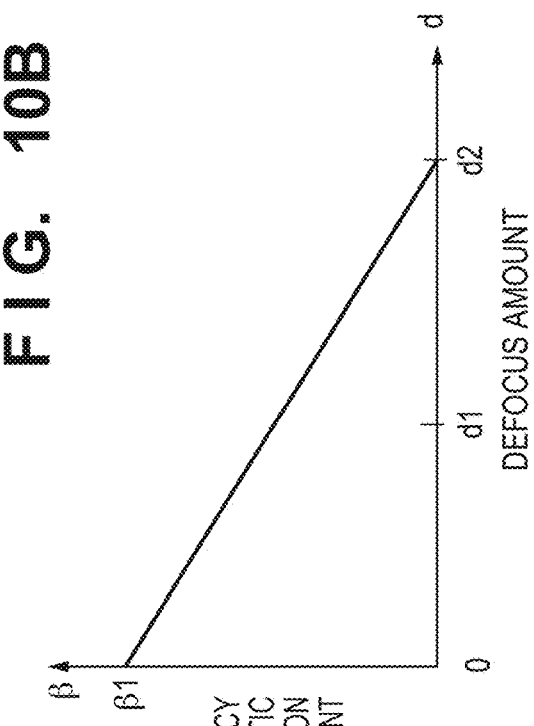
FIGS. 10A through 10D are views for illustrating a relationship between defocus amount and frequency characteristic restoration amount.
Figure 10B:
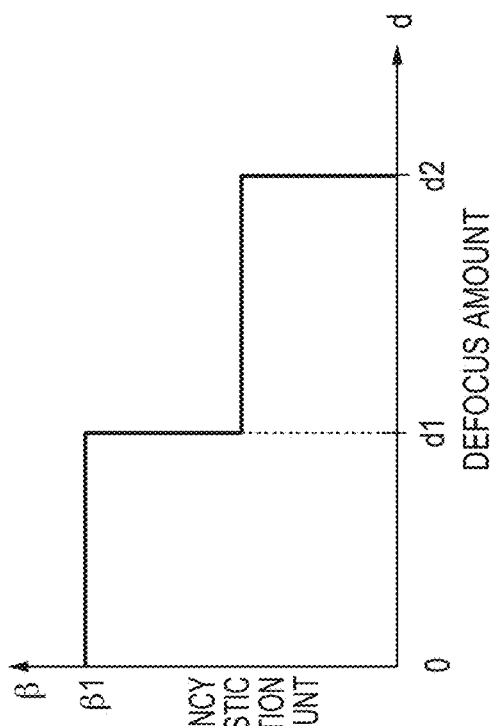
Figure 10C:
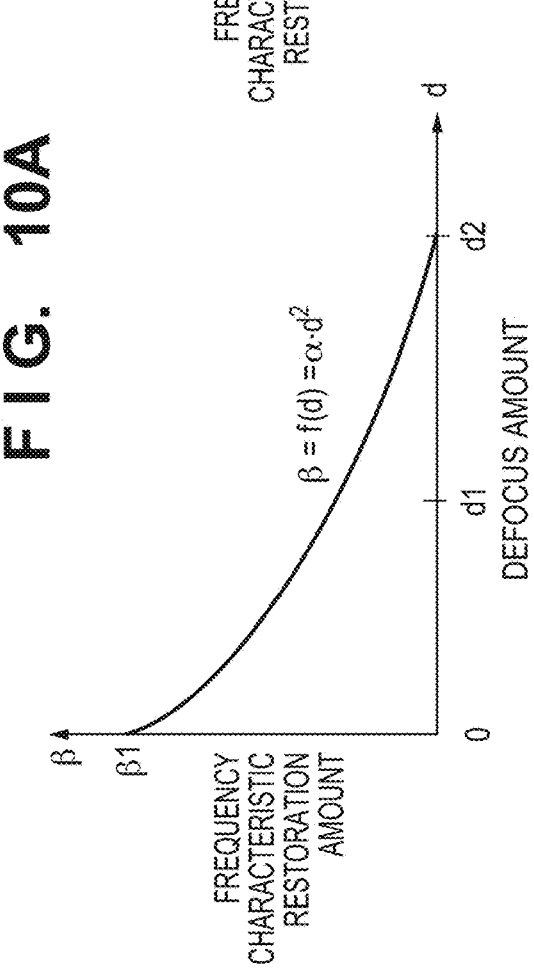

In the output image, to achieve an appropriate stereoscopic effect in consideration of the output characteristic of the output apparatus 102, the frequency characteristic restoration condition 403 is set so that the control amount with respect to a pixel of the in-focus region in the input image becomes maximally large, as illustrated in FIGS. 10A, 10B, and 10C. Furthermore, the control amount of a non-focused region is set so that the control amount becomes smaller as the defocus amount 205 becomes larger. In the case where the information corresponding to the distance from the focal plane is a defocus amount 205 that is proportional to a blurring amount of the image, the defocus amount and the frequency characteristic restoration amount have a monotonically decreasing non-linear relationship, as illustrated in FIG. 10A. Also, in the case where the information corresponding to the distance from the focal plane is the image shift amount 206, the relationship is linear, as in FIG. 10B. Also, as in FIG. 10C, even when the frequency characteristic restoration amount for a non-tolerably in-focus region is 0, the difference in sharpness between the tolerably in-focus region and the non-tolerably in-focus region approaches the difference in sharpness between the tolerably in-focus region and the non-tolerably in-focus region in the input image, as previously described, and so it is possible to achieve a stereoscopic effect in the output image.

Note that a filter used in the sharpness processing, in addition to being a Laplacian of Gaussian filter, may be something that adjusts the strength of a particular filter by a sharpness control amount. Here, the particular filter is a filter that is generated to calculate a reverse characteristic of deteriorated sharpness information of an output apparatus, for example.

Figure 10D:
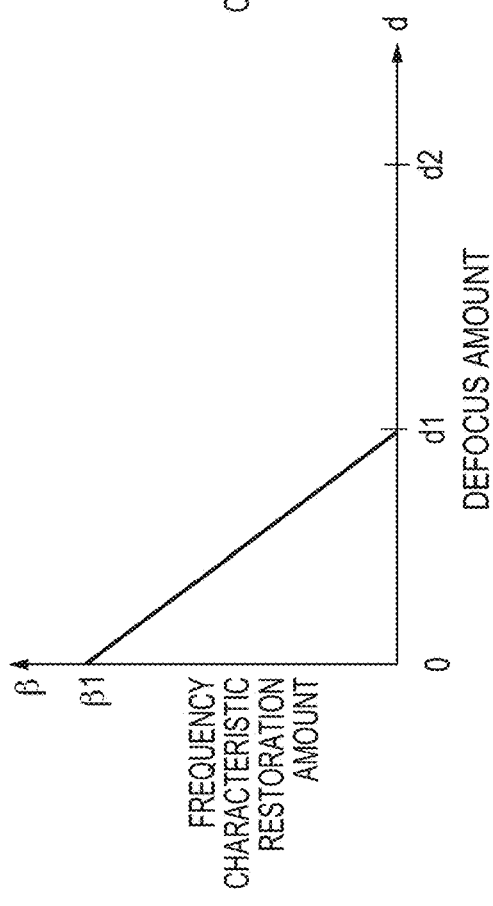

Also, an example of sharpness processing was described as processing for controlling sharpness above, but this may be contrast processing. Specifically, as illustrated in FIG. 10D, the frequency restoration amount is reduced in a stepwise fashion, and a luminance conversion is performed such that the contrast of the luminance value in each pixel of the input image data of the tolerably in-focus regions including the in-focus region becomes higher. A method of using a conversion formula where the sharpness control amount is made to be a coefficient and a method of enhancing the contrast by equalizing a histogram generated from the luminances of respective pixels of the input image data may be used for the luminance conversion, but there is no limitation to these if it is possible to control the contrast. Since it is possible to control the sharpness of the output image by sharpness processing and contrast processing, either of these processes, or a combination of these processes may be executed in accordance with the characteristics of the output apparatus 102.

Meanwhile, in the case where the resolution conversion processing is image reduction processing, smoothing processing is performed by applying a sharpness control amount set in the frequency characteristic restoration condition 403 while referencing a defocus amount in the defocus map for the same coordinate position in relation to luminance information for each pixel of input image data. For smoothing processing, for example, a Gaussian filter or the like as is illustrated in Equation (6) may be used. Here, β is a frequency characteristic restoration amount for the defocus amount 205 set in the frequency characteristic restoration condition 403.

$$f(x,y)=1/(2\pi\sigma^2)\exp[-(x^2+y^2)/(2\sigma^2)] \quad (6)$$

$$\sigma=\beta$$

To achieve an appropriate stereoscopic effect in the output image, the frequency characteristic restoration condition 403 is set such that the control amount corresponding to a pixel in an in-focus region in the input image becomes a minimum, as illustrated in FIGS. 14A, 14B, and 14C. Furthermore, the control amount of a non-focused region is set so that the control amount becomes smaller as the defocus amount 205 becomes larger. In other words, control is such that the non-focused region of the image after the resolution conversion processing is more blurred than the in-focus region.

In FIG. 14, β=β1 when the defocus amount d=0 indicates the control amount in relation to an in-focus region of an input image. Also, the defocus amount d1 is a value at the boundary between a tolerably in-focus region 505 and a non-tolerably in-focus region 506 as illustrated in FIG. 5B. Furthermore, the defocus amount d2 is the maximum defocus amount included in the defocus map.

In the case where the information corresponding to the distance from the focal plane is a defocus amount 205 that is proportional to a blurring amount of the image, the defocus amount and the frequency characteristic restoration amount have a non-linear relationship, as illustrated in FIG. 14A. Also, in the case where the information corresponding to the distance from the focal plane is the image shift amount 206, the relationship is linear, as in FIG. 14B.

Also, as in FIG. 14C, even when the frequency characteristic restoration amount for a tolerably in-focus region is 0, the difference in sharpness between the tolerably in-focus region and the non-tolerably in-focus region approaches the difference in sharpness between the tolerably in-focus region and the non-tolerably in-focus region in the input image, as previously described, and so it is possible to achieve a stereoscopic effect in the output image.

Note that a filter used in the smoothing processing, in addition to being a Gaussian filter, may be something that adjusts the strength of a particular filter by a sharpness control amount. Here, the particular filter is a filter that is generated to calculate a reverse characteristic of sharpness information of an output image, for example.

Also, an example of smoothing processing was described as processing for controlling sharpness above, but this may be contrast processing. Specifically, as illustrated in FIG. 14D, a luminance conversion is performed so that the contrast of luminance values of respective pixels in input image data of a tolerably in-focus region becomes higher. The luminance conversion may be performed by a method that uses a conversion formula in which a sharpness control amount is made to be a coefficient, but limitation is not made thereto if the method can control the contrast. Since it is possible to control the sharpness of the output image by smoothing processing and contrast processing, either of these processes, or a combination of these processes may be executed in accordance with the characteristics of the output apparatus 102.

[Frequency Characteristic Restoration Condition]

A method for generating the frequency characteristic restoration condition 403 in the frequency characteristic restoration processing will be described. A measurement chart as illustrated in FIG. 11 for example is outputted by the output apparatus 102 which may be a printer, a display, a projector, or the like, and a parameter set in the frequency characteristic restoration condition 403 is calculated from a frequency characteristic (MTF characteristic) of an output image of the output apparatus 102 obtained using a measurement apparatus (not shown). Also, configuration may be taken to use a method for calculating an MTF characteristic of the output apparatus 102 from an image obtained by simulating each image process for output image generation on a PC.

The chart illustrated in FIG. 11 is configured to include an group of images 1101 corresponding to a focal plane that is in-focus, and a group of a plurality of images 1102 represented by blurring corresponding to a blurring amount of an input image for a particular defocus amount 205. In more detail, it is a chart that includes a plurality of rectangular patterns or sinusoidal patterns with different spatial frequencies and uniform patterns 1103 and 1104. Note that what is illustrated in FIG. 11 is pluralities 1101 and 1102 of sinusoidal patterns with different spatial frequencies. The uniform patterns are configured to include a maximum pixel value and a minimum pixel value on the sinusoidal pattern.

Figure 12:
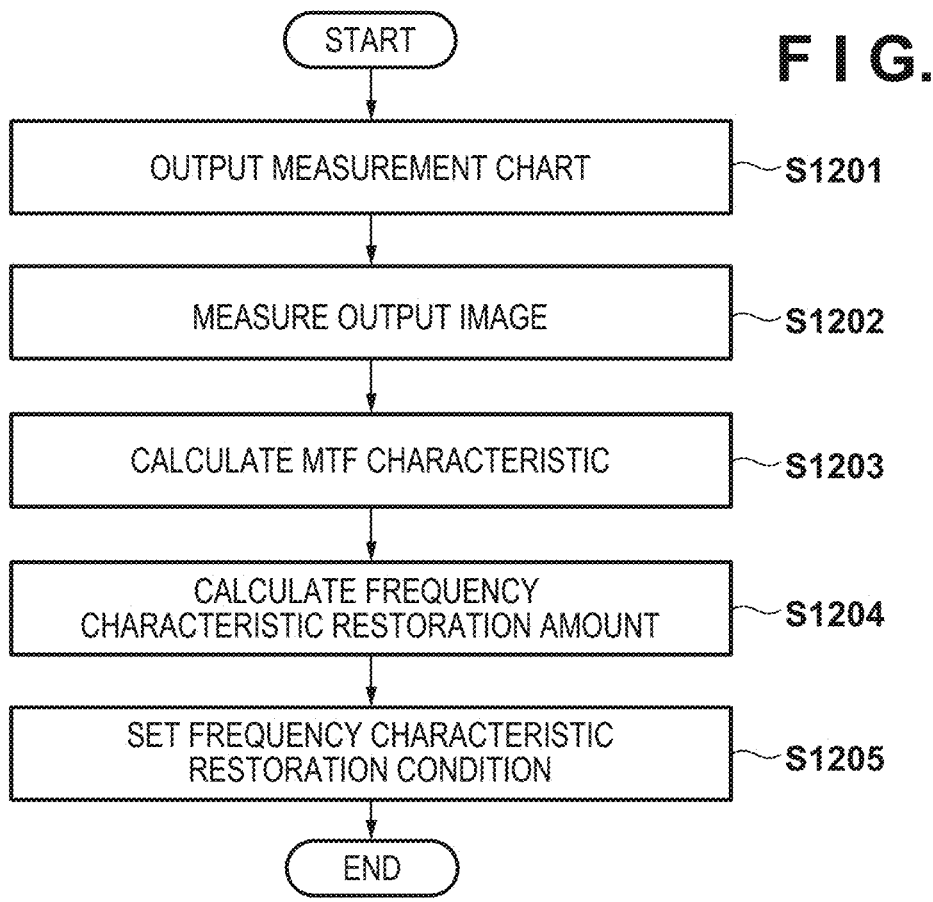
FIG. 12 is a flowchart for illustrating processing for generating a frequency characteristic restoration condition.

A method for generating the frequency characteristic restoration condition 403 will be described with reference to the flowchart of FIG. 12. First, the measurement chart illustrated in FIG. 11 is outputted (chart output, step S1201) in accordance with an output condition of the output apparatus 102 in FIG. 6 such as that for resolution conversion processing. Next, the measurement chart (not shown) outputted by the output apparatus 102 is measured by using the measurement apparatus, and information necessary for the MTF characteristic calculation is obtained (step S1202). In the case of a sinusoidal pattern, the MTF characteristic is calculated by Equation (7) or Equation (8) (step S1203). This value indicates an absolute value of an optical transfer function. In the case where the average brightness of the output image changes, Equation (8) may be used. The values of R1 and R2 in Equation (7) and Equation (8) are reflectances, but luminance, density, or device RGB values may be used. When the output apparatus 102 is a printer, a scanner, a digital camera, or a microscope may be used as the measurement apparatus (not shown), for example, and when the output apparatus 102 is a display or a projector, a digital camera may be used.

$$MTF(u)=C(u)/C' \qquad (7)$$

u is a sinusoidal frequency $$C(u)=[Max(u)-Min(u)]/[Max(u)+Min(u)]$$

$$C'=(R1-R2)/(R1+R2)$$

Max(u) is a maximum reflectance of a sinusoidal pattern that changes with the frequency Min(u) is a minimum reflectance of a sinusoidal pattern that changes with the frequency R1 and R2 are reflectances of the uniform patterns (R1>R2)

$$MTF(u)=[Max(u)-Min(u)]/[R1-R2] \qquad (8)$$

Also, in the case of a rectangular wave pattern, the MTF characteristic of the output apparatus 102 is represented by a contrast transfer function (CTF) obtained by applying Equation (7) or Equation (8). Also, an MTF value resulting from converting a CTF value by a Coltman correction formula may be used.

By the previously-described method, the frequency characteristics (MTF characteristics) of the respective images of the image group 1101 corresponding to the focal plane included in the measurement chart and the image group 1102 corresponding to a particular defocus amount are obtained.

Figure 13:
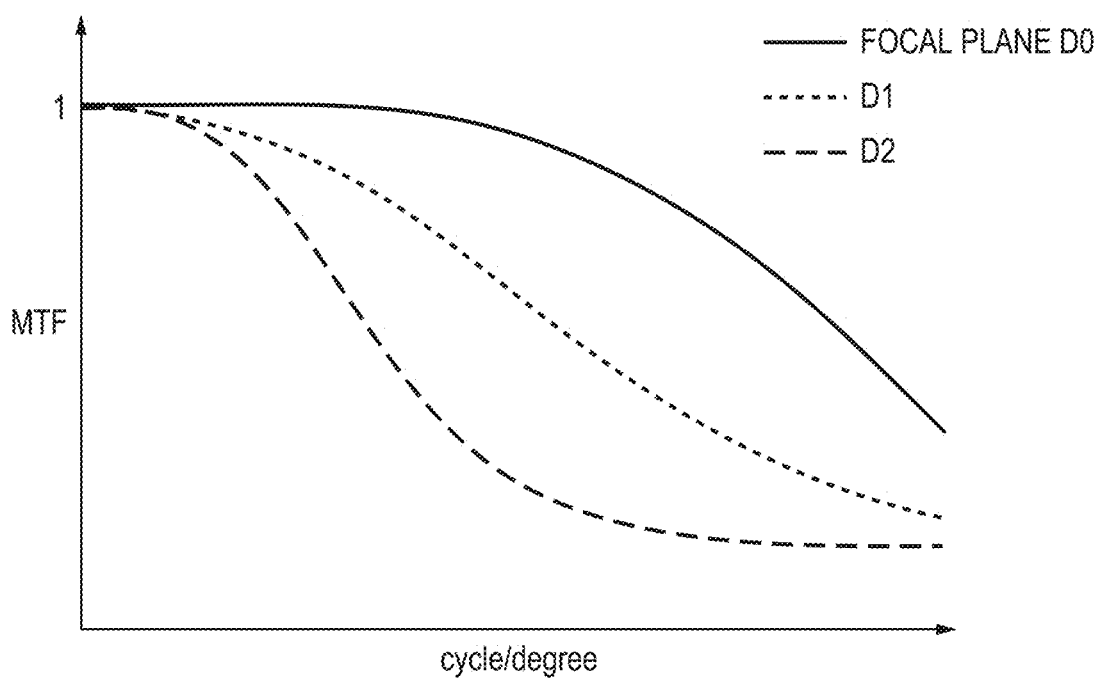
FIG. 13 is a view for illustrating MTF characteristics.

The example of the frequency characteristics is illustrated in FIG. 13. In FIG. 13, the solid line D0 indicates characteristics of the image group 1101 corresponding to the focal plane, and the dotted line D1 indicates a characteristic of an image group corresponding to the defocus amount 205 included in a tolerably in-focus region. Also, the dashed line D2 indicates a characteristic of the image group corresponding to the defocus amount 205 included in a non-tolerably in-focus region.

By this, it is possible to obtain the MTF characteristics for each defocus amount 205. In other words, an output characteristic related to the sharpness of the output apparatus 102 for each defocus amount is obtained. Meanwhile, to obtain an appropriate stereoscopic effect in the output image, it is necessary that compared to the case where the frequency characteristic restoration processing is not applied, the difference in sharpness between the tolerably in-focus region and the non-tolerably in-focus region of the output image when the frequency characteristic restoration processing is applied approaches the difference in sharpness between the tolerably in-focus region and the non-tolerably in-focus region in the input image. In other words, configuration may be such that in order to appropriately control the difference in sharpness between the tolerably in-focus region and the non-tolerably in-focus region in the output image, the sharpness control amount is set in accordance with an output characteristic that affects the sharpness of the output apparatus 102 for each defocus amount. For example, the frequency characteristic restoration amount is set (step S1204) so as to, by sharpening processing, restore a sharpness or frequency characteristic of an in-focus region of the output image at a particular spatial frequency to a sharpness or frequency characteristic of the input image.

Similarly, for a non-focused region as well, a restoration amount is calculated from the MTF characteristic obtained for each defocus amount and is made to be the frequency characteristic restoration amount. Consequently, the sharpness control amounts corresponding to the defocus amount 205 indicated in FIG. 10 and FIG. 14 are calculated. The relationship between defocus amount and sharpness, as illustrated in FIG. 10 and FIG. 14, may be a method of setting as a relationship expression that takes the defocus amount 205 as input and the sharpness control amount as output and may be a method of selecting and setting parameters by an LUT method. Also, limitation is not made thereto, and other methods may be used if it is possible to calculate a sharpness control amount for the defocus amount 205.

Also, the frequency characteristic restoration amount is not limited to a value for restoring the MTF characteristic. When the difference in sharpness in an in-focus region and a non-focused region set in the frequency characteristic restoration condition 403 in the case of performing sharpening processing depending on the defocus amount and the frequency characteristic restoration amount is larger than the difference in sharpness in the case where the sharpening processing is not performed, an appropriate stereoscopic effect is obtained in the output image. Furthermore, when the control amount β1 of the focal plane illustrated in FIG. 10 is set to restore the MTF characteristic of the image from 0.8 to 1.2, an image whose focal plane sharpness in the output image is advantageous is achieved.

Also, in the present embodiment, the example of a relationship between the defocus amount 205 and the frequency characteristic restoration amount was described as the frequency characteristic restoration condition 403, but a relationship between the image shift amount 206 which is information corresponding to the distance from the focal plane or the distance 304 between the focal plane and an object and the frequency characteristic restoration amount may be made to be the frequency characteristic restoration condition 403.

As described above, the frequency characteristic restoration condition 403 derived from the output characteristic related to the sharpness of the output apparatus 102 according to the defocus amount 205 is set (step S1205). By processing the input image data by the set frequency characteristic restoration condition 403, it becomes possible to control the stereoscopic effect of the output image.

Figure 6:
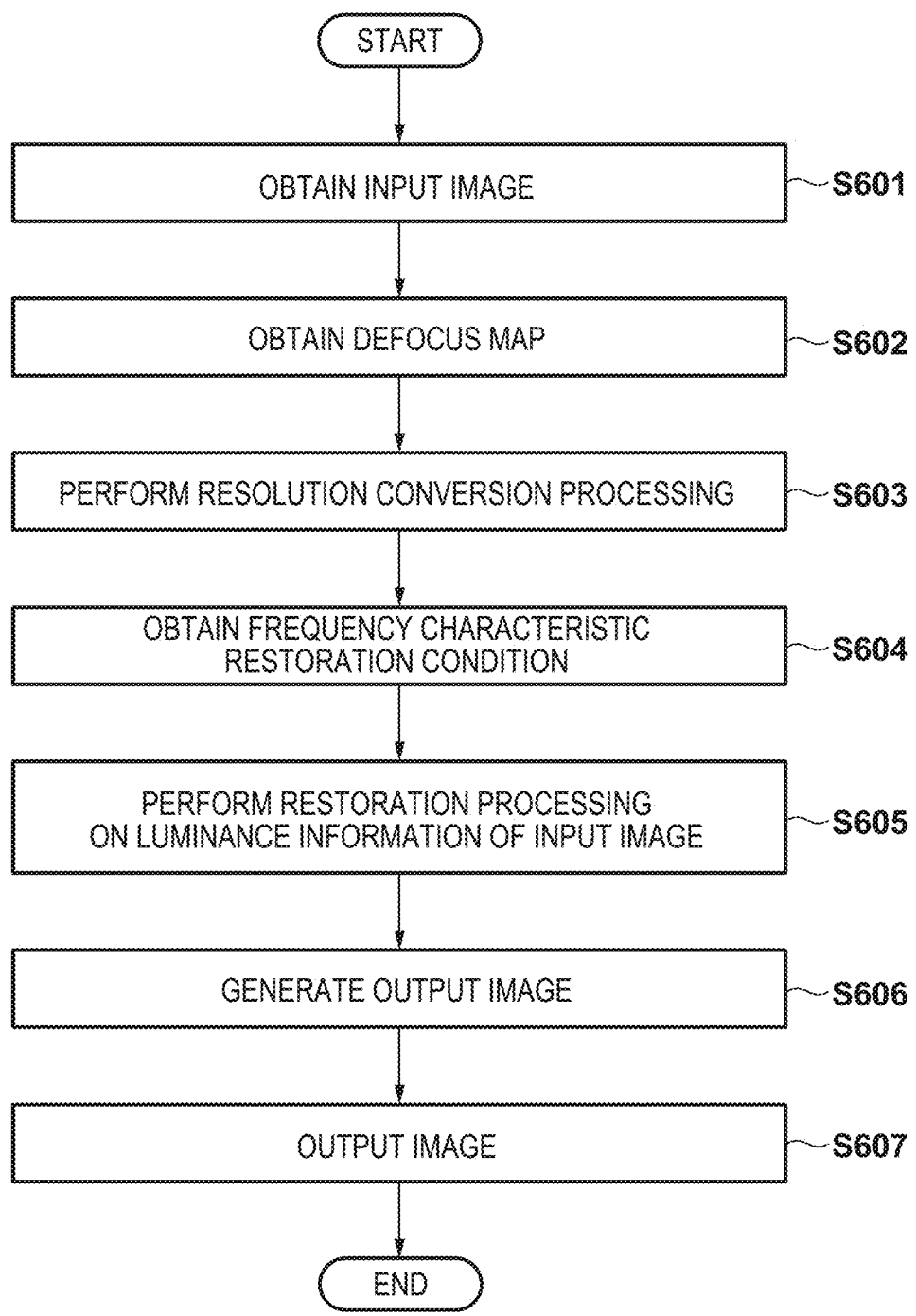
FIG. 6 is a flowchart illustrating image processing.

Also, in FIG. 6, performing the resolution conversion processing in step S603 was described, but configuration may be taken so as perform processing to determine whether or not to perform the resolution conversion processing prior to step S603. Note that the determination processing may be performed based on the content of the print information data, for example. Also, in the case where performance of the resolution conversion processing is determined, the processing from step S603 is performed, and in the case where non-performance of the resolution conversion processing is determined, the output image is generated in step S606 without performing the processing of step S603 to step S605.

Second Embodiment

Figure 15:
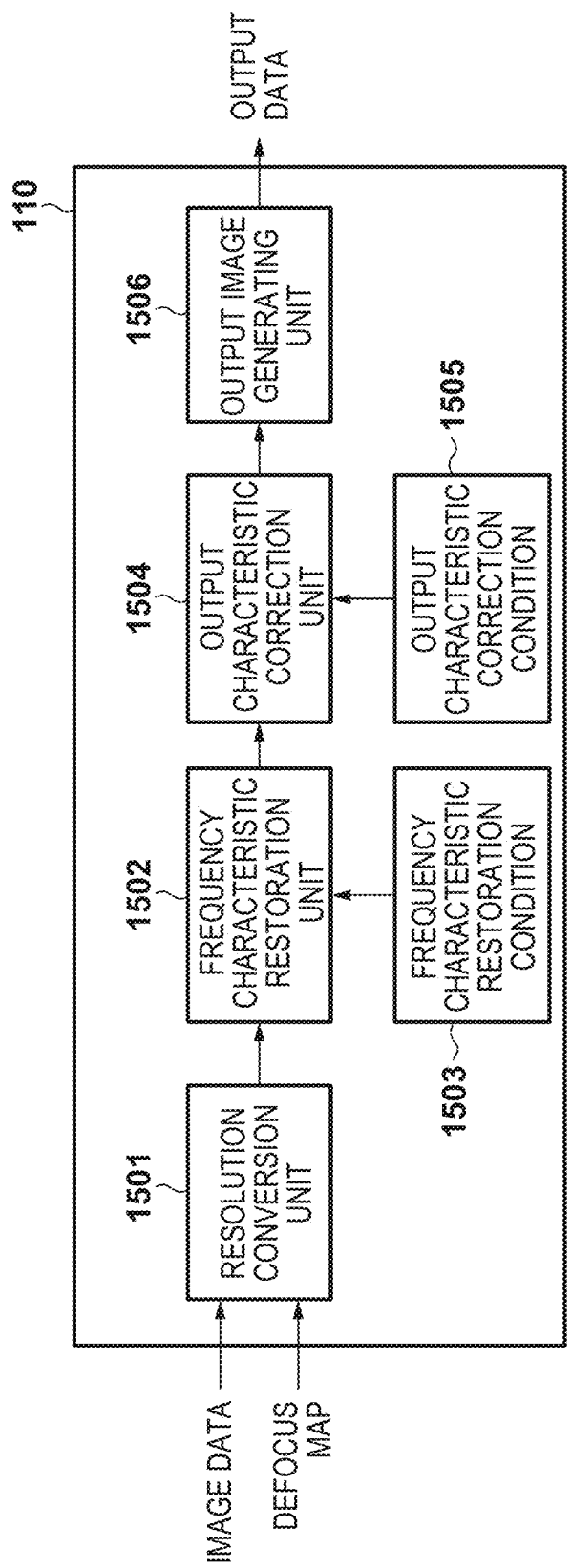
FIG. 15 is a view for illustrating a configuration of an image processing unit.
Figure 16:
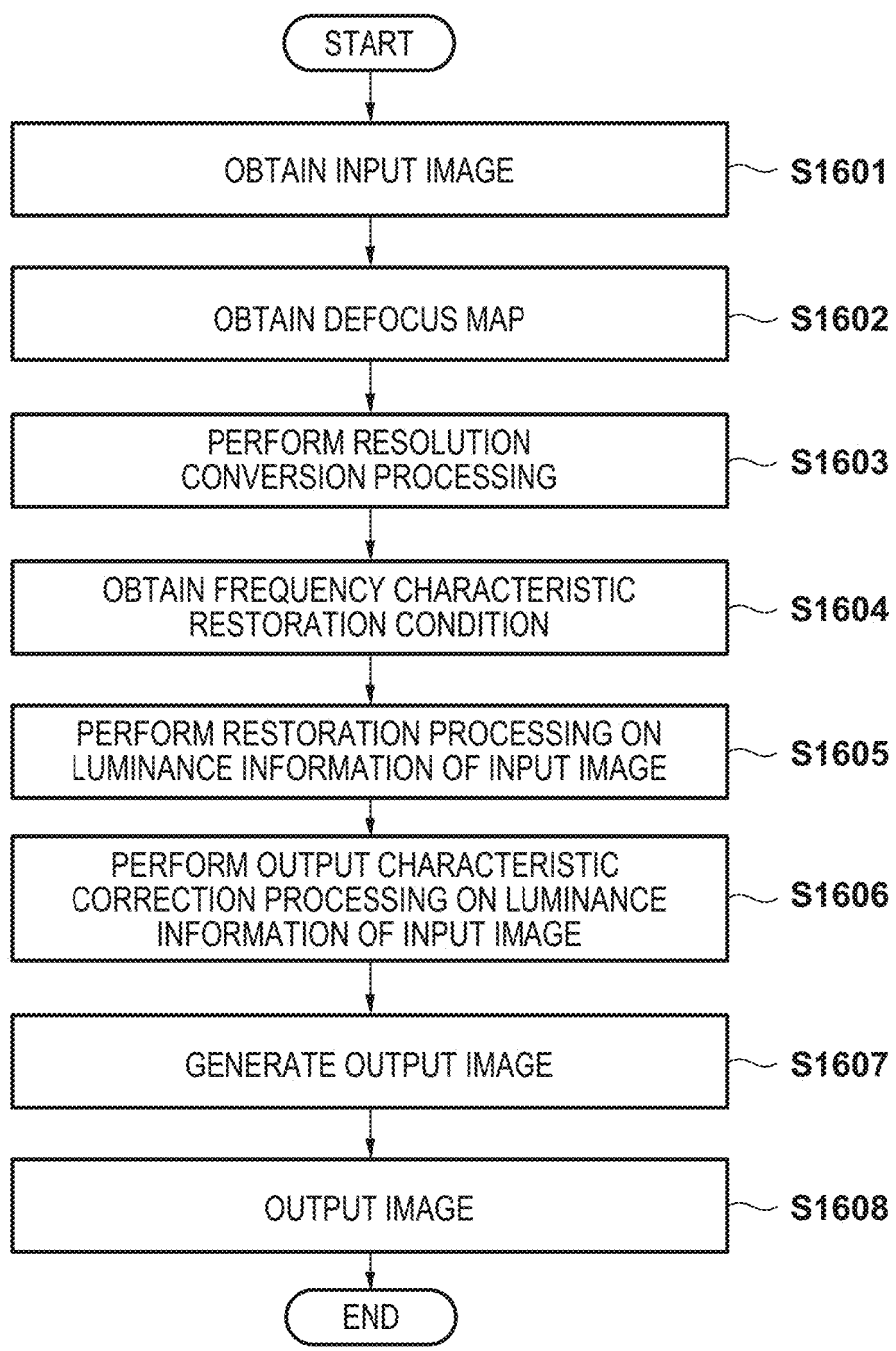
FIG. 16 is a flowchart illustrating image processing.

Below, a second embodiment will be described regarding points that differ from the first embodiment. FIG. 15 is a view illustrating a configuration of the image processing unit 110 of the present embodiment, and FIG. 16 is a flowchart illustrating image processing. In the present embodiment, in addition to the configuration of the first embodiment, there is an output characteristic correction unit 1504 and an output characteristic correction condition 1505. A resolution conversion unit 1501, a frequency characteristic restoration unit 1502, a frequency characteristic restoration condition 1503, and an output image generating unit 1506 respectively correspond to the resolution conversion unit 401, the frequency characteristic restoration unit 402, the frequency characteristic restoration condition 403, and the output image generating unit 404.

In the present embodiment, firstly, the image processing unit 110 obtains (step S1601) input image data, and obtains (step S1602) the above-described defocus map as information corresponding to the distance from the focal plane at the time of capture. Next, the resolution conversion unit 1501 changes (step S1603) the number of pixels of the input image data in accordance with the number of pixels of the output image data. Common image magnification or reduction processing is used to change the number of pixels of the input image data in the resolution conversion unit 1501.

Next, the frequency characteristic restoration unit 1502 obtains (step S1604) the frequency characteristic restoration condition 1503, and based on the defocus map obtained in step S1602, performs (step S1605) restoration processing for a frequency characteristic in relation to input image data after the resolution conversion processing. Also, the frequency characteristic restoration condition 1503 is stored in a memory device (hard disk, ROM, or the like) in the output apparatus 102. Next, the output characteristic correction unit 1504 performs (step S1606) correction processing on the image after the frequency characteristic restoration processing based on the output characteristic correction condition 1505. The output characteristic correction condition 1505 is stored in a memory device (hard disk, ROM, or the like) in the output apparatus 102.

The output image generating unit 404, in relation to output image data (RGB) outputted from the output characteristic correction unit 1504, generates (step S1607) data for printing by a printhead of an ink-jet printer. Output data generated by the output image generating unit 1506 is sent to the printing unit 111, and printed (step S1608) on a printing medium. Since configurations other than the configurations of the output characteristic correction unit 1504 and the output characteristic correction condition 1505 are similar to the first embodiment, description thereof is omitted.

[Stereoscopic Effect in the Output Image]

Figure 17:
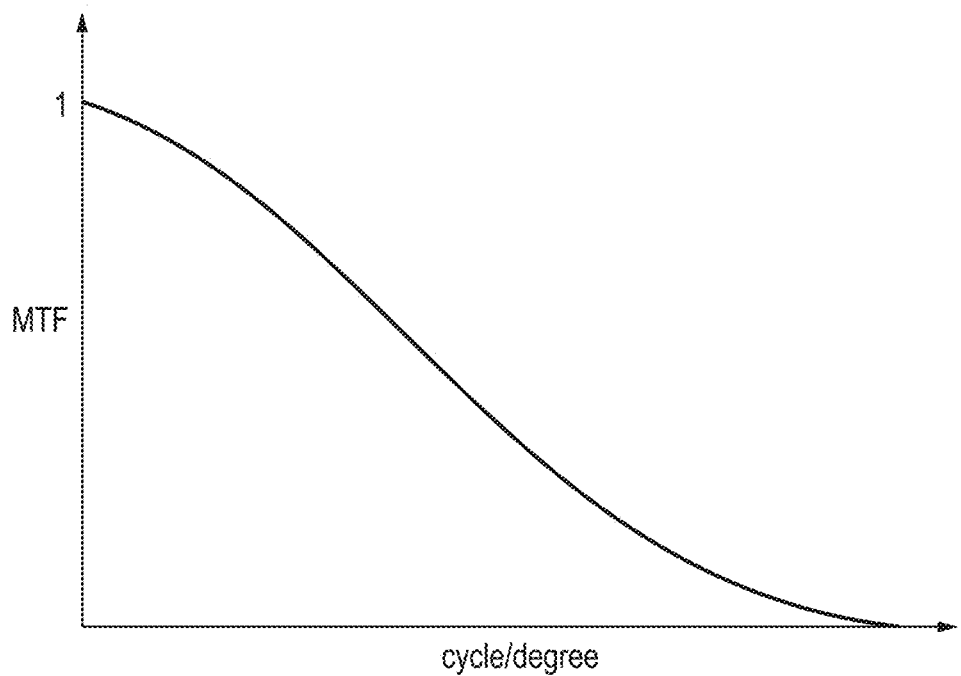
FIG. 17 is a view for illustrating MTF characteristics.

Description will be given for an output characteristic that affects the sharpness of an image outputted from the output apparatus and the stereoscopic effect. When outputting an image by the output apparatus 102 which may be a printer or the like as described in the present embodiment, the image sharpness may deteriorate due to ink bleeding depending on the printing medium and the ink, or output processing such as halftoning. Similarly in a display or projector, the sharpness of an image deteriorates in the output image. In FIG. 17, a frequency characteristic (MTF characteristic) response of an image according to a printer is illustrated. As illustrated in FIG. 17, responsiveness deteriorates as the spatial frequency increases, and the sharpness of an image deteriorates.

FIG. 18 illustrates a relationship between contrast between an in-focus region and a non-focused region in an input image and an output image. In order to simplify the description, description will be given using an example of an image that has the same frequency peak in the spatial frequency characteristics of an image corresponding to a particular defocus amount included in a non-focused region and the spatial frequency characteristics of an image in an in-focus region.

Assume that in input image data which has the stereoscopic effect due to blurring, there is a relationship as illustrated in FIG. 18A between a contrast value C1 which indicates a sharpness of the in-focus region and a contrast value C2 which indicates a sharpness of a non-focused region of the input image data for a particular spatial frequency. In the output image, the MTF characteristic of FIG. 17 is applied, and as illustrated in FIG. 18B, the contrast values C1 and C2 change into C1' and C2'.

The amount of change in sharpness of the input image data differs in the in-focus region and the non-focused region depending on the characteristics of the output apparatus 102. The difference (the relationship 1802 of the contrast values C1' and C2') in sharpness, which affects the stereoscopic effect, is less than the difference (the relationship 1801 between the contrast values C1 and C2) in sharpness for the input image data, and an output image with an appropriate stereoscopic effect is not achieved. Thus, it is possible to obtain an output image with a stereoscopic effect by appropriately restoring the frequency characteristic of the image to control the sharpness based on the state of blurring of the image corresponding to the previously-described defocus amount 205 and a change in the output characteristic that affects the sharpness of the output image.

In the output image resulting from appropriately controlling the sharpness of the image by using the output characteristic correction amount according to the defocus amount 205 set in a later-described output characteristic correction condition 1505, the relationship of contrast values between the above-described in-focus region and non-focused region, is respectively C1" and C2" as illustrated in FIG. 18C. The difference (the relationship 1803 between the contrast values C1" and C2") in sharpness of the output image resulting from correction processing based on the output characteristic correction processing of the present embodiment becomes larger than the difference (the relationship 1802 between the contrast values C1' and C2') in sharpness in the case when the processing is not performed. Accordingly, it is possible to achieve an appropriate stereoscopic effect since the difference (the relationship 1801 between the contrast values C1 and C2) in sharpness in the input image is approached.

In FIG. 18, to simplify the description, the contrast corresponding to two points of the spatial frequency of an image of an in-focus region and the spatial frequency of an image corresponding to a particular defocus amount 205 of a non-focused region are compared, but it is similar for images corresponding to an in-focus region and another defocus amount 205 of a non-focused region. Also, it is similar even for two points between an image corresponding to a particular defocus amount 205 included in a tolerably in-focus region and an image corresponding to a particular defocus amount 205 included in a non-tolerably in-focus region.

Contrast values are used as the image characteristic that affects the sharpness of the image, but the same relationship can be described even for a spatial frequency characteristic that indicates sharpness for a change in the sharpness of an image between an in-focus region and a non-focused region according to an output characteristic of the output apparatus 102.

Thus far, it has been described that the stereoscopic effect is lost in relation to the input image due to the conversion of the frequency characteristic (sharpness) of the image according to the characteristics of the output apparatus 102, but by appropriately restoring the frequency characteristic of the in-focus region and the non-focused region, an appropriate stereoscopic effect is imparted to the output image. Focusing on the amount of correction of the in-focus region and the non-focused region in the output characteristic correction processing in the output characteristic correction unit 1504, the relationship is as illustrated in FIG. 18D. In other words, when the in-focus region of an image including the focal plane and the non-focused region are compared, the amount of correction of the in-focus region is larger than the amount of correction of the spatial frequency characteristic of the non-focused region.

In the present embodiment, the output characteristic correction processing corrects the sharpness of the image by the output characteristic correction processing condition 1505 derived from the output characteristic related to the sharpness of the output apparatus 102 according to the defocus amount 205. Here, as the processing for controlling the sharpness of the image, similarly to the frequency characteristic restoration processing in the first embodiment, sharpness processing and contrast processing is performed. Also, the output characteristic correction condition is set by a similar method to when deriving the frequency characteristic restoration conditions 403 and 1503 in the first embodiment. In other words, for each output condition (for example, the printing medium, the ink, or the like), the chart illustrated in FIG. 11 is outputted, a characteristic (MTF characteristic) of the output apparatus is obtained, and a correction condition is calculated similarly to the frequency characteristic restoration conditions 403 and 1503. The output characteristic correction amount calculated by such a method is set as the output characteristic correction amount according to the defocus amount 205 as illustrated in FIG. 19.

Figure 19A:
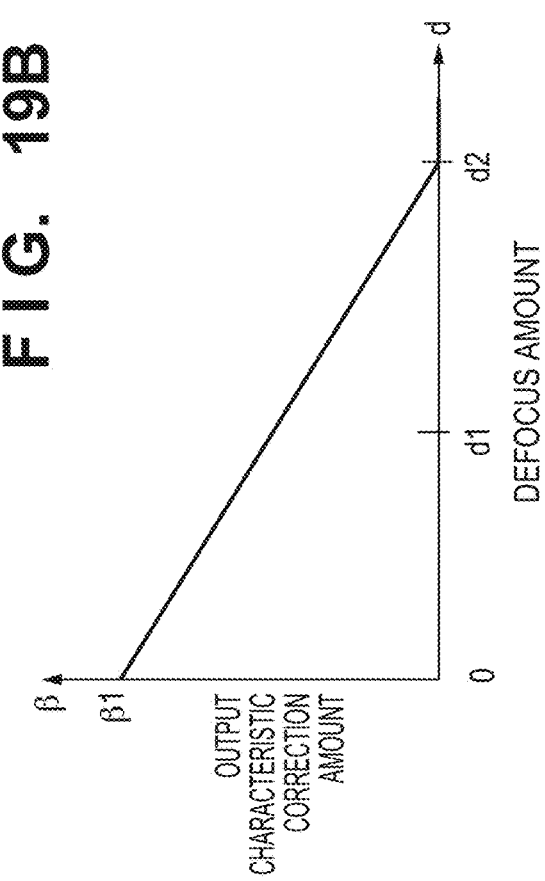
FIGS. 19A through 19D are views for illustrating a relationship between a defocus amount and an output characteristic correction amount.
Figure 19B:
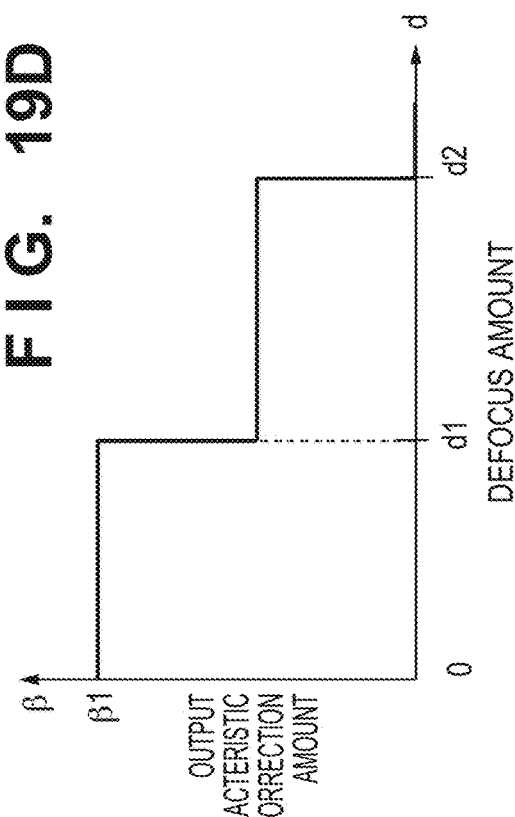
Figure 19C:
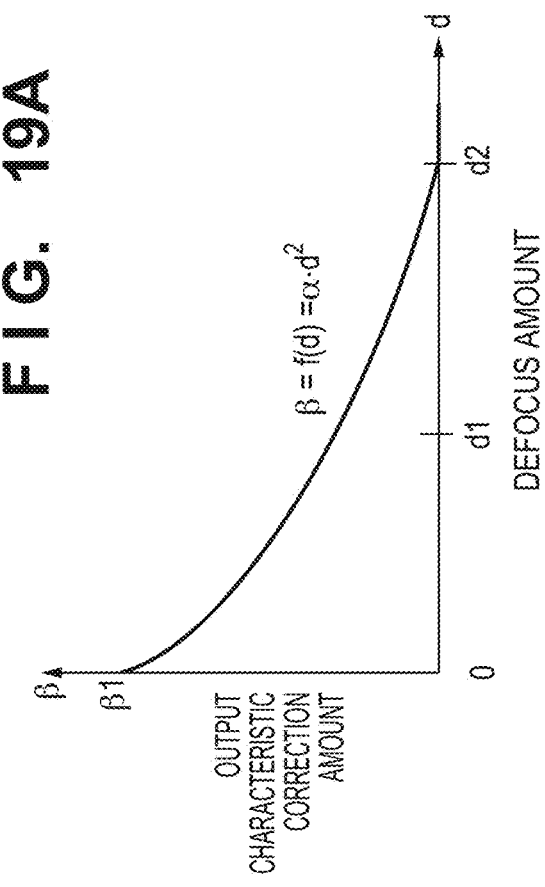
Figure 19D:
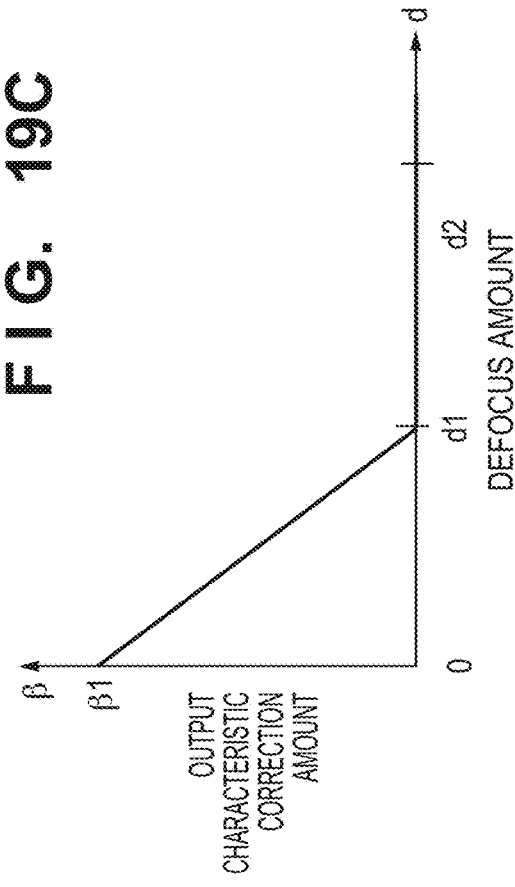

To achieve an appropriate stereoscopic effect in the output image, the output characteristic correction amount is set such that the control amount corresponding to a pixel in an in-focus region in the input image becomes a minimum, as illustrated in FIGS. 19A, 19B, and 19C. Furthermore, the control amount of a non-focused region is set so that the amount of correction becomes smaller as the defocus amount becomes larger. Also, in the case where contrast processing is executed in the output characteristic correction unit 1504, the output characteristic correction amount is as in FIG. 19D. A luminance conversion is performed so that the contrast of luminance values of respective pixels in input image data of a tolerably in-focus region including an in-focus region becomes higher. A method of using a conversion formula where the output characteristic correction amount is made to be a coefficient and a method of enhancing the contrast by equalizing a histogram generated from the luminances of respective pixels of the input image data may be used for the luminance conversion, but there is no limitation to these if it is possible to control the contrast. Since it is possible to control the sharpness of the output image by sharpness processing and contrast processing, either of these processes, or a combination of these processes may be executed in accordance with the characteristics of the output apparatus 102.

Figure 20A:
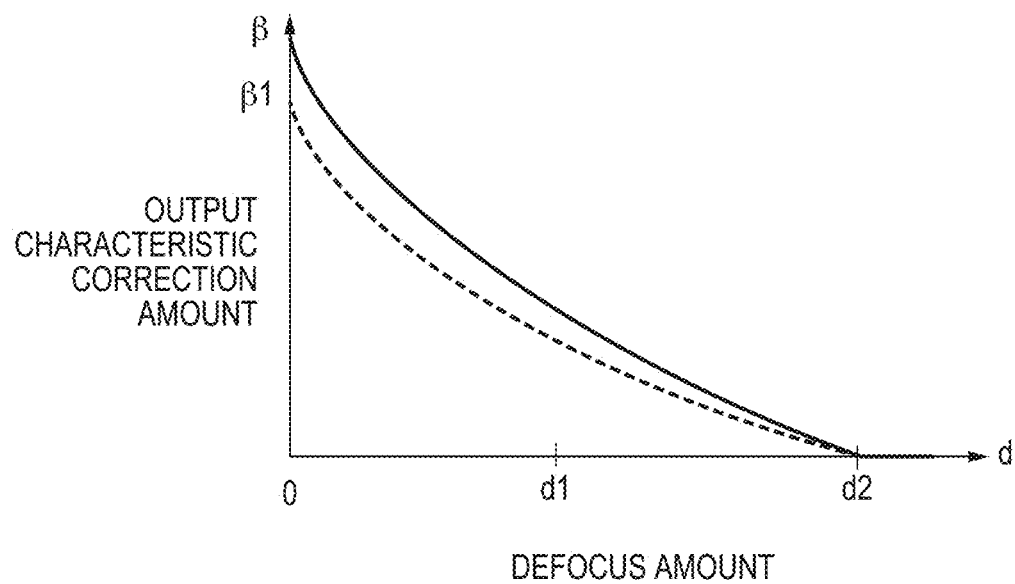
FIGS. 20A and 20B are views for describing cases where the output characteristic correction amount is different.
Figure 20B:
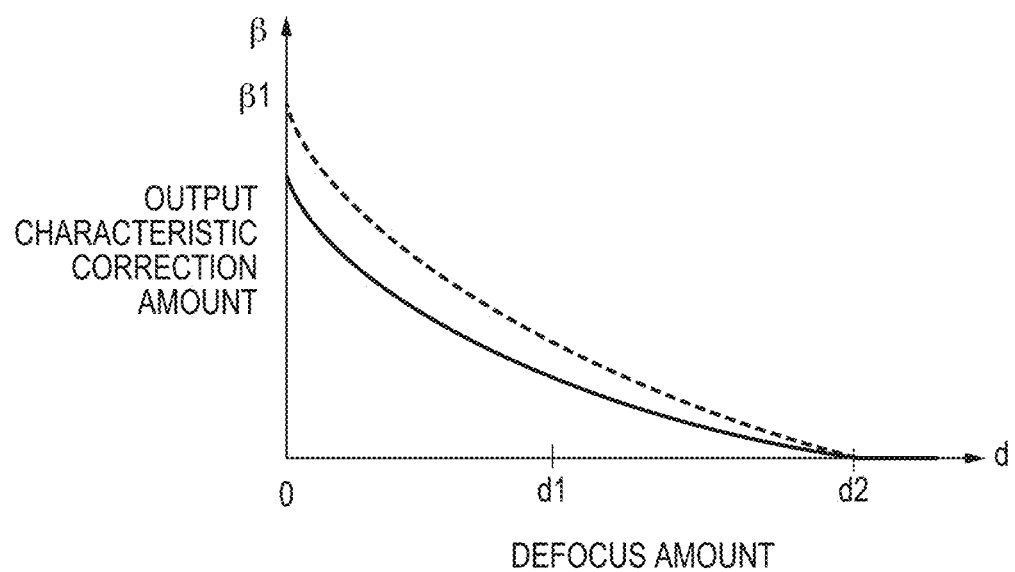

Also, the output characteristic correction amount differs, as illustrated in FIG. 20, depending on a characteristic of the printing medium, a characteristic of the ink, and the printing medium size. This is because the degree of deterioration in the sharpness of the image due to ink bleeding differs for each printing medium and ink characteristic. The dashed line in FIG. 20A indicates a line of output characteristic correction amount in relation to the defocus amount 205 when outputted by a different condition to FIG. 19A. For example, FIG. 20A illustrates a case in which there is more ink bleeding than FIG. 19A. Conversely, FIG. 20B illustrates a case in which there is less ink bleeding than FIG. 19A. In this way, in the present embodiment, using the output characteristic correction condition 1505 derived from the output characteristic related to sharpness of the output apparatus 102 according to the defocus amount 205, an output characteristic correction is performed on the image after the frequency characteristic restoration processing. Thus, together with change of the stereoscopic effect by the resolution conversion processing, change of the stereoscopic effect due to the characteristic of the output apparatus 102 can also be corrected appropriately. Thus, in accordance with the information corresponding to the distance from the focal plane at the time of capture and sharpness reproduction characteristics of the output apparatus 102, an output image for which the sharpness of the in-focus region and the non-focused region are controlled appropriately is achieved.

Also, in FIG. 16, performing the resolution conversion processing in step S1603 was described, but configuration may be taken so as perform processing to determine whether or not to perform the resolution conversion processing prior to step S1603. Note that the determination processing may be performed based on the content of the print information data, for example. Also, in the case where performance of the resolution conversion processing is determined, the processing from step S1603 is performed, and in the case where non-performance of the resolution conversion processing is determined, the output characteristic correction processing in step S1606 is performed without performing the processing of step S1603 to step S1605.

Also, in the embodiment described above, a configuration in which data captured by an image capturing apparatus such as a camera is used as image data in a photographic image and a defocus amount at a time of capture is used as information corresponding to the distance from the focal plane was described. However, when a photographic image obtained by capturing is edited using software for image editing, and a focal position is corrected, there are cases where the focus amount for each region in the image changes. In such a case, the image data after amendment and the defocus amount after the change may be used. Also, configuration may be taken so as to not obtain the focus amount on the image capturing apparatus side but to analyze a captured image with software for image editing, and to obtain the focus amount by such analysis.

Also, limitation is not made thereto, and data of a photographic image generated by software for, for example, modeling, rendering, or image editing and information corresponding to the distance from the focal plane generated by software corresponding to the image data may be used. In such software, there are cases where blur information of an image is generated using a map which is information corresponding to the distance from the focal plane.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-025351, filed Feb. 15, 2018, which is hereby incorporated by reference herein in its entirety.

What is claimed is:

1. An image processing apparatus comprising:
a memory device configured to store a parameter for reproducing a stereoscopic effect of an image that image data prior to a resolution conversion represents, wherein the parameter controls a sharpness corresponding to distance information related to a distance from a focal plane in a photographic image;
at least one processor, which executes instructions stored in at least one memory, being configured to:
(1) input image data of the photographic image;
(2) convert a resolution of the image data;
(3) based on the distance information and a rate of the resolution conversion, use the parameter stored in the memory device to perform processing for controlling of a sharpness of the image on data of each pixel of the image data resulting from the resolution conversion; and
(4) output image data resulting from the processing for controlling the sharpness,
wherein in a case where the converted resolution is higher than the resolution prior to the resolution conversion, a degree to which the parameter that is used by the at least one processor controls the sharpness in a case where a distance corresponding to the distance information is a first distance is larger than a degree to which the parameter that is used by the at least one processor controls the sharpness in a case where the distance corresponding to the distance information is a second distance larger than the first distance.

2. The image processing apparatus according to claim 1, wherein, in a case where the converted resolution is lower than the resolution prior to the resolution conversion, a degree to which the parameter that is used by the at least one processor controls the sharpness in a case where the distance corresponding to the distance information is the first distance is smaller than a degree to which the parameter that is used by the at least one processor controls the sharpness in a case where the distance corresponding to the distance information is the second distance.

3. The image processing apparatus according to claim 1, wherein the distance information includes a defocus amount.

4. The image processing apparatus according to claim 1, wherein a relative relationship for sharpness between a first region determined to be in-focus and a second region determined to not be in-focus in image data resulting from the processing for controlling the sharpness is closer to a relative relationship for sharpness between the first region and the second region in the image data than in image data resulting from the resolution conversion and on which the at least one processor is to perform processing for controlling the sharpness.

5. The image processing apparatus according to claim 1, wherein a difference between a sharpness of a first region determined to be in-focus corresponding to predetermined distance information and a sharpness of a second region determined to not be in-focus corresponding to the predetermined distance information becomes smaller by the resolution conversion, and
wherein the processing for controlling the sharpness is for making the difference after the resolution conversion approach the difference prior to the resolution conversion.

6. The image processing apparatus according to claim 1, wherein the at least one processor is further configured to:
output, in accordance with an output condition, a measurement chart corresponding to specific distance information and including a plurality of patterns corresponding to a plurality of spatial frequencies, and
based on the outputted measurement chart, obtain the parameter stored in the memory device, and
wherein the at least one processor performs processing for controlling the sharpness of an image related to image data resulting from the resolution conversion by using the obtained parameter.

7. The image processing apparatus according to claim 6, wherein the at least one processor obtains an MTF characteristic from the outputted measurement chart, and obtains the parameter based on the MTF characteristic.

8. The image processing apparatus according to claim 6, wherein the output condition includes a condition related to the resolution conversion.

9. The image processing apparatus according to claim 5, wherein the at least one processor is further configured to:
output, in accordance with a condition related to at least either a printing medium or an ink, a measurement chart corresponding to specific distance information and including a plurality of patterns corresponding to a plurality of frequencies; and
based on the outputted measurement chart, obtain an amount of correction of an output characteristic, and
wherein the at least one processor corrects image data resulting from the processing for controlling the sharpness using the obtained amount of correction of the output characteristic.

10. The image processing apparatus according to claim 1, wherein the processing for controlling the sharpness includes at least either sharpness processing or contrast processing.

11. The image processing apparatus according to claim 1, wherein the photographic image is obtained by capturing a subject.

12. The image processing apparatus according to claim 1, wherein the focal plane is a focal plane at a time of capturing a subject.

13. The image processing apparatus according to claim 1, wherein the at least one processor outputs the image data resulting from the processing for controlling the sharpness as at least either a print or a display.

14. An image processing method comprising:
inputting image data of a photographic image;
converting a resolution of the inputted image data;
based on distance information related to a distance from a focal plane in the photographic image and a rate of the resolution conversion, using a parameter, which is for reproducing a stereoscopic effect of an image that the image data prior to the resolution conversion represents and which controls a sharpness corresponding to the distance information, to perform processing for controlling the sharpness of the image in relation to data of each pixel of image data resulting from the resolution conversion; and
outputting image data resulting from the processing for controlling the sharpness,
wherein in a case where the converted resolution is higher than the resolution prior to the resolution conversion, a degree to which the parameter used in the processing for controlling the sharpness controls the sharpness in a case where a distance corresponding to the distance information is a first distance is larger than a degree to which the parameter used in the processing for controlling the sharpness controls the sharpness in a case where the distance corresponding to the distance information is a second distance larger than the first distance.

15. A non-transitory computer-readable storage medium storing a program for causing a computer to operate so as to:
input image data of a photographic image;
convert a resolution of the inputted image data;
based on distance information related to a distance from a focal plane in the photographic image and a rate of the resolution conversion, use a parameter, which is for reproducing a stereoscopic effect of an image that the image data prior to the resolution conversion represents and which controls a sharpness corresponding to the distance information, to perform processing for controlling the sharpness of the image in relation to data of each pixel of image data resulting from the resolution conversion; and
output image data resulting from the processing for controlling the sharpness,
wherein in a case where the converted resolution is higher than the resolution prior to the resolution conversion, a degree to which the parameter used in the processing for controlling the sharpness controls the sharpness in a case where a distance corresponding to the distance information is a first distance is larger than a degree to which the parameter used in the processing for controlling the sharpness controls the sharpness in a case where the distance corresponding to the distance information is a second distance larger than the first distance.

* * * * *